United States Patent
Morino et al.

(10) Patent No.: US 10,997,713 B2
(45) Date of Patent: May 4, 2021

(54) INSPECTION DEVICE, INSPECTION METHOD, AND STORAGE MEDIUM

(71) Applicants: KABUSHIKI KAISHA TOSHIBA, Minato-ku (JP); NuFlare Technology, Inc., Yokohama (JP)

(72) Inventors: Takeshi Morino, Yokohama (JP); Hideaki Okano, Yokohama (JP); Yoshinori Honguh, Yokohama (JP); Ryoichi Hirano, Tokyo (JP); Masataka Shiratsuchi, Kawasaki (JP); Hideaki Hashimoto, Yokohama (JP)

(73) Assignees: KABUSHIKI KAISHA TOSHIBA, Minato-ku (JP); NuFlare Technology, Inc., Yokohama (JP)

( * ) Notice: Subject to any disclaimer, the term of this patent is extended or adjusted under 35 U.S.C. 154(b) by 170 days.

(21) Appl. No.: 16/288,621

(22) Filed: Feb. 28, 2019

(65) Prior Publication Data
US 2019/0279349 A1    Sep. 12, 2019

(30) Foreign Application Priority Data

Mar. 8, 2018 (JP) .............................. JP2018-042048

(51) Int. Cl.
| | | |
|---|---|---|
| *G06K 9/32* | (2006.01) | |
| *G06K 9/62* | (2006.01) | |
| *G06T 7/00* | (2017.01) | |
| *G06T 7/11* | (2017.01) | |
| *G06T 5/00* | (2006.01) | |

(52) U.S. Cl.
CPC .............. *G06T 7/001* (2013.01); *G06T 5/002* (2013.01); *G06T 5/009* (2013.01); *G06T 7/11* (2017.01); *G06T 7/97* (2017.01); *G06T 2207/20021* (2013.01); *G06T 2207/30148* (2013.01)

(58) Field of Classification Search
CPC ........... G06T 7/30–7/38; G06T 7/0002–7/001; G06T 2207/30148; G06T 2207/30168; G06T 2207/20224; G03F 1/84–1/86; G01N 2021/95676; G01N 21/9505

See application file for complete search history.

(56) References Cited

U.S. PATENT DOCUMENTS

| | | | |
|---|---|---|---|
| 6,396,943 B2 * | 5/2002 | Yamashita | .............. G06T 7/001 382/144 |
| 6,868,175 B1 | 3/2005 | Yamamoto et al. | |

(Continued)

FOREIGN PATENT DOCUMENTS

| | | |
|---|---|---|
| JP | 8-35936 A | 2/1996 |
| JP | 10-253544 A | 9/1998 |

(Continued)

*Primary Examiner* — Brian Werner
(74) *Attorney, Agent, or Firm* — Oblon, McClelland, Maier & Neustadt, L.L.P.

(57) ABSTRACT

According to one embodiment, an inspection device includes: an image generation device configured to generate a second image corresponding to a first image; and a defect detection device configured to estimate a nonlinear shift based on a plurality of partial region sets, each of the partial region sets including a first partial region in the first image and a second partial region in the second image corresponding to the first partial region, and detect a defect in the second image from the first image.

17 Claims, 19 Drawing Sheets

(56) References Cited

U.S. PATENT DOCUMENTS

| | | | |
|---|---|---|---|
| 8,019,144 B2 | 9/2011 | Sugihara | |
| 10,522,376 B2 * | 12/2019 | Lauber | H01L 21/67288 |
| 2006/0018530 A1 | 1/2006 | Oaki et al. | |
| 2006/0215900 A1 | 9/2006 | Oaki et al. | |
| 2012/0076410 A1 * | 3/2012 | Sonoura | G01N 21/956 382/173 |
| 2013/0294677 A1 | 11/2013 | Urano et al. | |
| 2017/0186144 A1 * | 6/2017 | Chien | G06T 5/002 |

FOREIGN PATENT DOCUMENTS

| | | |
|---|---|---|
| JP | 11-251377 A | 9/1999 |
| JP | 11-312716 A | 11/1999 |
| JP | 11-328410 A | 11/1999 |
| JP | 2005-277395 | 10/2005 |
| JP | 2005-292016 A | 10/2005 |
| JP | 3965189 | 8/2007 |
| JP | 2009-198440 | 9/2009 |
| JP | 4533689 | 9/2010 |
| JP | 2015-115504 | 6/2015 |
| KR | 10-2013-0109162 A | 10/2013 |

* cited by examiner

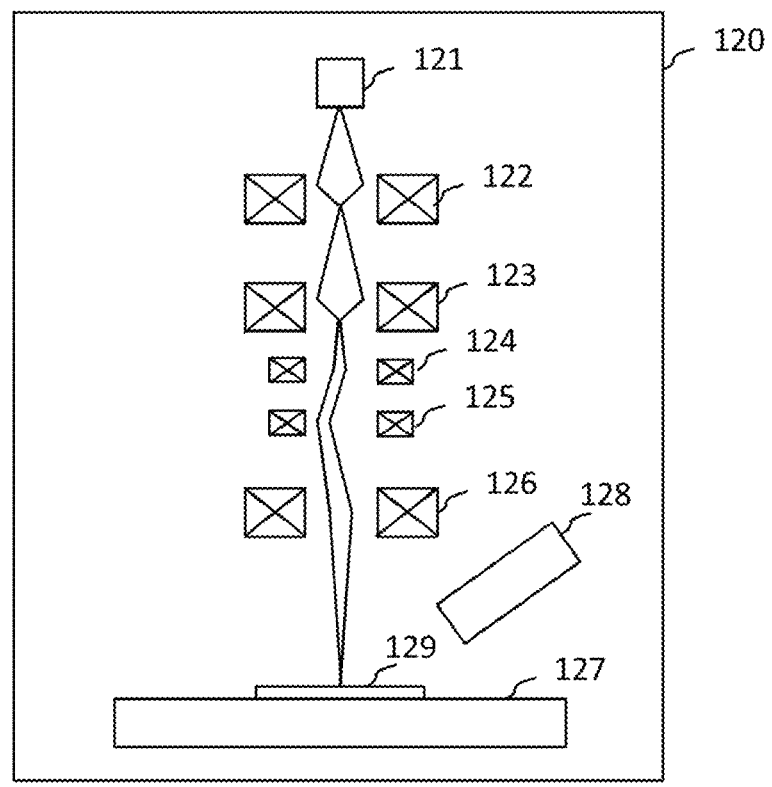
F I G. 14

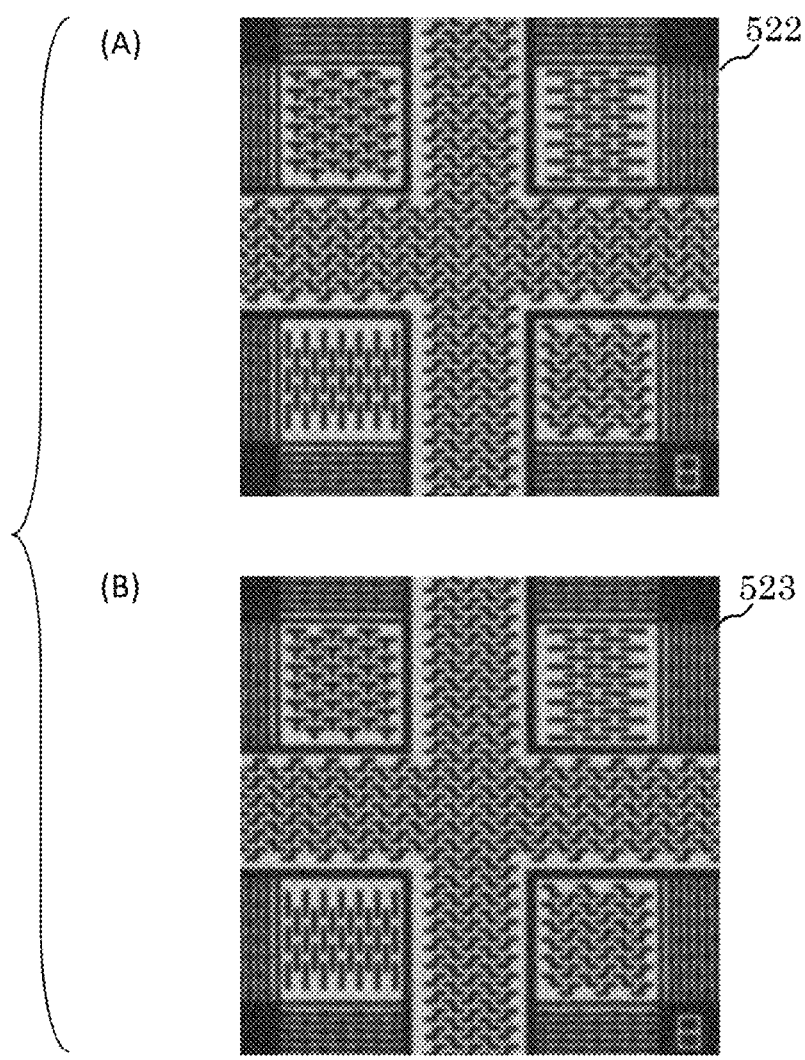
F I G. 17

INSPECTION DEVICE, INSPECTION METHOD, AND STORAGE MEDIUM

CROSS-REFERENCE TO RELATED APPLICATIONS

This application is based upon and claims the benefit of priority from Japanese Patent Application No. 2018-042048, filed Mar. 8, 2018, the entire contents of which are incorporated herein by reference.

FIELD

Embodiments described herein relate generally to an inspection device capable of detecting a defect in a mask used for the manufacture of a semiconductor device.

BACKGROUND

Along with miniaturization of a semiconductor device and a mask for an exposure apparatus used for the manufacture of the semiconductor device, an inspection device for inspecting the semiconductor device and the mask has been developed.

In general, in the inspection of a semiconductor device and a mask, processing of comparing and calculating a reference image serving as a reference of a correct state and an actually acquired inspection target image to generate a differential image between them is performed. If no defect exists at all in the inspection target image, the differential image is a flat image having an almost predetermined tone. On the other hand, if a defect exists, a pattern with a conspicuous change in brightness with respect to the periphery appears in the differential image at the same position as the defect.

The inspection target image generated by the inspection device includes a position shift and a spatial distortion caused by a reason unavoidable in principle or the environment at the time of inspection. In this case, a pattern called a pseudo-defect with a conspicuous change in brightness with respect to the periphery may occur in the differential image generated in the above-described way, although it is not originally a defect.

Hence, various techniques of correcting the inspection target image or the reference image by measuring and estimating the position shift and distortion, and suppressing detection errors caused by the pseudo-defect have been proposed.

However, to accurately measure and estimate the position shift and distortion so as not to cause a detection error by the pseudo-defect, an enormous amount of calculation may be needed. For this reason, a high cost may be generated for a computer for defect detection, and the cost may be a cost factor that cannot be neglected in the semiconductor device manufacture.

BRIEF DESCRIPTION OF THE DRAWINGS

FIG. 14 is a schematic view for explaining an example of a hardware configuration of a real image data generation device in an inspection device according to a modification of the first embodiment;

FIG. 17 is a schematic view for explaining an example of reference image data and inspection target image data according to the modification of the first embodiment;

DETAILED DESCRIPTION

Figure 1:
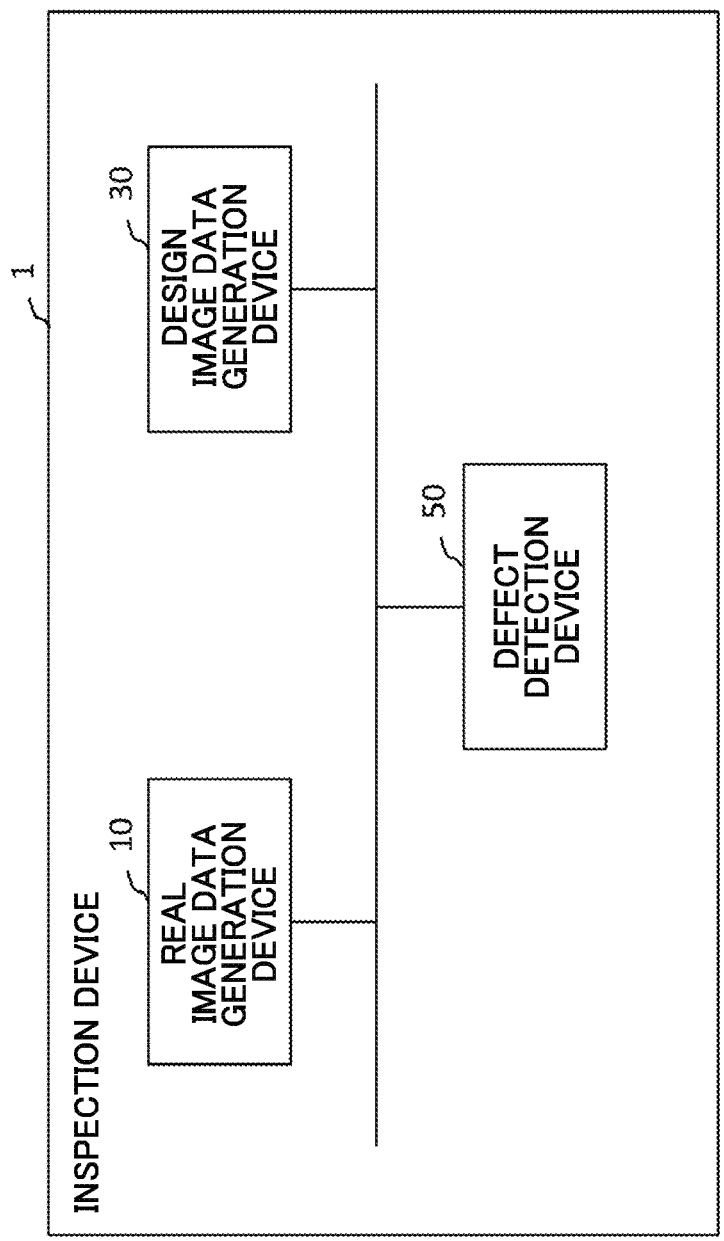
FIG. 1 is a block diagram for explaining an example of an overall configuration of an inspection device according to a first embodiment.

In general, according to one embodiment, an inspection device includes: an image generation device configured to generate a second image corresponding to a first image; and a defect detection device configured to: estimate a nonlinear shift based on a plurality of partial region sets, each of the partial region sets including a first partial region in the first image and a second partial region in the second image corresponding to the first partial region; and detect a defect in the second image from the first image.

Embodiments will now be described with reference to the accompanying drawings. Note that the same reference numerals denote the constituent components having the same functions and configurations in the following description.

1. First Embodiment

An inspection device according to a first embodiment will be described.

The inspection device according to the first embodiment includes, for example, a mask defect inspection device for inspecting a defect in a mask used for the manufacture of a semiconductor device. The semiconductor device includes, for example, a semiconductor storage device such as a NAND flash memory.

1.1 Hardware Configuration

The hardware configuration of the inspection device according to the first embodiment will be described.

1.1.1 Overall Configuration

The overall configuration of the inspection device according to the first embodiment is described.

FIG. 1 is a block diagram showing an example of the overall configuration of the inspection device according to the first embodiment. As shown in FIG. 1, an inspection device 1 includes a real image data generation device 10, a design image data generation device 30, and a defect detection device 50.

The real image data generation device 10 has a function of a scanner that generates, as real image data, an optical image of a photomask or a reticle used for the manufacture of, for example, a semiconductor device (not shown). The photomask or the reticle will also simply be referred to as "mask" in the following explanation. The real image data generation device 10 sends the real image data generated for the mask to the defect detection device 50.

The design image data generation device 30 has a function of generating design image data corresponding to the mask based on design data created for the manufacture of the mask. The design data is stored in advance in the design image data generation device 30 in the format of, for example, CAD (Computer-Aided Design) data. The design image data generation device 30 converts the design data into a data format (design image data) applicable to defect detection processing in the defect detection device 50 and then sends the converted design image data to the defect detection device 50.

The defect detection device 50 receives the real image data from the real image data generation device 10 and the design image data from the design image data generation device 30. The defect detection device 50 regards a set of a plurality of real image data generated for the same mask or a set of real image data and design image data as a set of inspection target image data and reference image data. The inspection target image data indicates image data serving as the target of defect detection. The reference image data indicates image data serving as the reference when performing defect detection for the inspection target image data. The defect detection device 50 compares inspection target image data and reference image data corresponding to the inspection target image data, thereby detecting a defect existing in the inspection target image data. The defect detection device 50 specifies the defect existing in the mask based on the defect detected in the inspection target image data.

1.1.2 Hardware Configuration of Real Image Data Generation Device

The hardware configuration of the real image data generation device in the inspection device according to the first embodiment is described.

Figure 2:
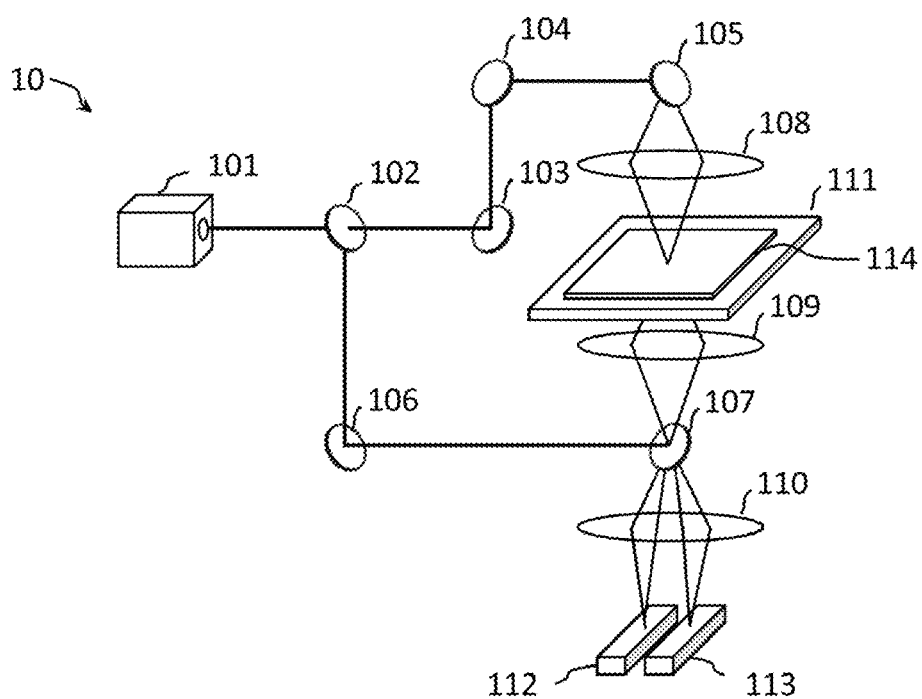
FIG. 2 is a schematic view for explaining an example of a hardware configuration of a real image data generation device in the inspection device according to the first embodiment.

FIG. 2 is a schematic view for explaining the hardware configuration of the real image data generation device according to the first embodiment. In FIG. 2, an optical scanner capable of generating an optical image (transmitted optical image and/or reflected optical image) of a mask 114 as real image data is shown as an example of the real image data generation device 10.

As shown in FIG. 2, the real image data generation device 10 includes a light source 101, a plurality of half mirrors 102, 103, 104, 105, 106, and 107, a plurality of objective lenses 108, 109, and 110, a stage 111, a transmitted light sensor 112, and a reflected light sensor 113.

The light source 101 is, for example, a laser light source capable of emitting an ultraviolet laser beam. The laser beam emitted by the light source 101 passes through the half mirrors 102 to 107 and the objective lenses 108 and 109, and the mask 114 placed on the stage 111 is irradiated with the laser beam. More specifically, the half mirrors 102 to 105 and the objective lens 108 constitute a transmission optical system, and the half mirrors 102, 106, and 107 and the objective lens 109 constitute a reflecting optical system. With the configuration as described above, the mask 114 can be illuminated from the upper and lower sides, and the transmitted light and reflected light from the mask 114 can be input to the transmitted light sensor 112 and the reflected light sensor 113, respectively, via the objective lens 110.

The transmitted light sensor 112 and the reflected light sensor 113 detect the transmitted light and the reflected light from the mask 114, respectively. The real image data generation device 10 processes the detected transmitted light and reflected light by a processor (not shown) to generate real image data of the mask 114. The generated real image data is sent to the defect detection device 50.

Note that as described above, the real image data generated by the real image data generation device 10 may be used as both inspection target image data and reference image data in the defect detection device 50. That is, when comparing identical patterns formed on the mask 114, a set of a plurality of real image data generated for the identical patterns may be regarded as a set of inspection target image data and reference image data. Such a way of using real image data is also called DD (Die to Die) comparison. On the other hand, when comparing a pattern formed on the mask 114 with a pattern on design data, a set of real image data generated by the real image data generation device 10 and design image data generated by the design image data generation device 30 may be regarded as a set of inspection target image data and reference image data. Such a way of using real image data and design image data is also called DB (Die to Database) comparison.

1.1.3 Hardware Configuration of Defect Detection Device

Figure 3:
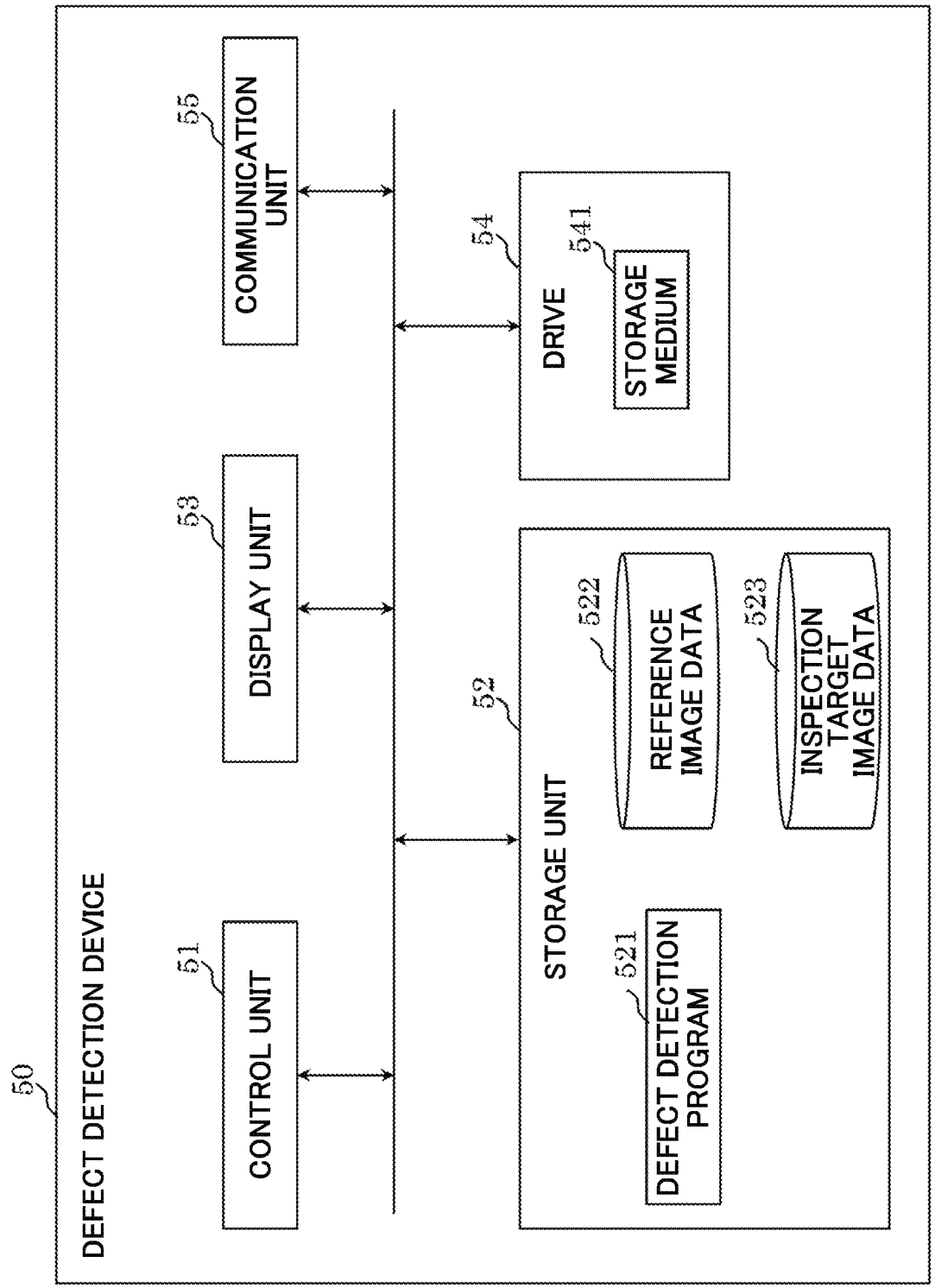
FIG. 3 is a block diagram for explaining an example of a hardware configuration of a defect detection device in the inspection device according to the first embodiment.

The hardware configuration of the defect detection device in the inspection device according to the first embodiment is described. FIG. 3 is a block diagram for explaining the hardware configuration of the defect detection device in the inspection device according to the first embodiment.

As shown in FIG. 3, the defect detection device 50 includes a control unit 51, a storage unit 52, a display unit 53, a drive 54, and a communication unit 55.

The control unit 51 includes a CPU (Central Processing Unit), a RAM (Random Access Memory), a ROM (Read Only Memory), and the like, and controls the operation of the defect detection device 50 entirely.

The storage unit 52 is, for example, an auxiliary storage device such as a HDD (Hard Disk Drive) or a SSD (Solid State Drive). The storage unit 52 stores a defect detection program 521 executed by the defect detection device 50. In addition, the storage unit 52 stores, for example, reference image data 522 and inspection target image data 523 as input information necessary when executing the defect detection program 521.

The defect detection program 521 is a program configured to cause the defect detection device 50 to execute defect detection processing of detecting, from the inspection target image data 523, a point significantly different from the reference image data 522 as a defect. Note that details of the defect detection processing is described later.

The display unit 53 includes, for example, a display screen (for example, an LCD (Liquid Crystal Display) or an EL (Electroluminescence) display), and the like. The display unit 53 outputs the execution result of the defect detection program 521 executed by the control unit 51 to the user.

The drive 54 is, for example, a CD (Compact Disc) drive or a DVD (Digital Versatile Disc) drive, and is a device configured to load a program stored in a storage medium 541. The type of the drive 54 can appropriately be selected in accordance with the type of the storage medium 541. The defect detection program 521 may be stored in the storage medium 541.

The storage medium 541 is a medium that accumulates information such as a recorded program electrically, magnetically, optically, or mechanically or by a chemical action so that a computer or another device or machine can read the information such as a program. The defect detection device 50 may acquire the defect detection program 521 from the storage medium 541.

The communication unit 55 is a communication interface that controls communication between the defect detection device 50 and the outside including the real image data generation device 10 and the design image data generation device 30. The communication unit 55, for example, receives real image data and design image data from the outside and stores them in the storage unit 52. In addition, the communication unit 55 outputs a comparison result generated as the execution result of the defect detection program 521 to the outside.

1.2 Functional Configuration

The functional configuration of the inspection device according to the first embodiment is described.

1.2.1 Functional Configuration of Defect Detection Device

The functional configuration of the defect detection device in the inspection device according to the first embodiment is described.

The control unit 51 of the defect detection device 50, for example, deploys the defect detection program 521 stored in the storage unit 52 into the RAM. The control unit 51 then interprets and executes, by the CPU, the defect detection program 521 deployed into the RAM and controls the constituent components.

Figure 4:
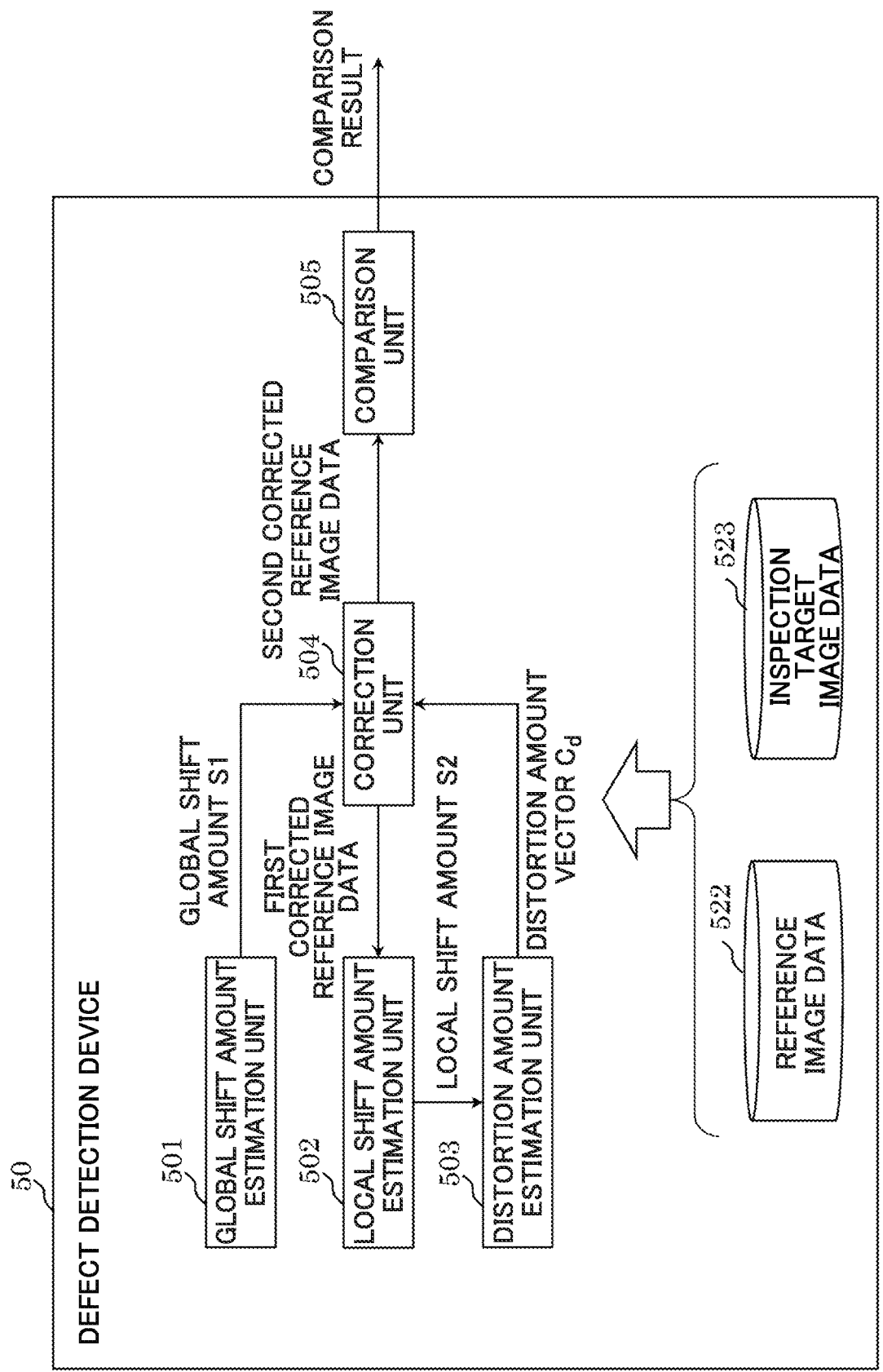
FIG. 4 is a block diagram for explaining an example of a functional configuration of the defect detection device in the inspection device according to the first embodiment.

FIG. 4 is a block diagram for explaining a portion concerning defect detection processing in the functional configuration of the defect detection device in the inspection device according to the first embodiment.

As shown in FIG. 4, when executing defect detection processing based on the reference image data 522 and the inspection target image data 523, the defect detection device 50 functions as a computer including a global shift amount estimation unit 501, a local shift amount estimation unit 502, a distortion amount estimation unit 503, a correction unit 504, and a comparison unit 505. Note that the following explanation will be made assuming that each of the reference image data 522 and the inspection target image data 523 is a set of the luminance values of pixels mapped on a XY-plane formed by an X-axis and a Y-axis which cross each other. More specifically, a luminance value at coordinates (x, y) of the reference image data 522 is represented by $I_R(x, y)$, and a luminance value at coordinates (x, y) of the inspection target image data 523 is represented by $I_S(x, y)$.

Each of the global shift amount estimation unit 501 and the local shift amount estimation unit 502 has a function of estimating a shift amount S that minimizes the error between two image data. More specifically, for example, the global shift amount estimation unit 501 and the local shift amount estimation unit 502 calculate an evaluation value E in accordance with an equation (1) as shown below.

$$E(s_x, s_y) = \Sigma_{j=0}^{N-1} \Sigma_{i=0}^{N-1} (I_S(i-s_x, j-s_y) I_R(i,j))^2 \quad (1)$$

Here, the evaluation range of the two image data is the range (0≤x, y≤N−1) formed by N×N pixels.

The global shift amount estimation unit 501 and the local shift amount estimation unit 502 estimate the shift amount $S=(s_x, s_y)$ that minimizes the calculated evaluation value E. This can estimate the shift amount S with which the luminance differences in the entire evaluation range between the two image data most match when one image data is shifted from the other image data. Such a linear matching method between two image data is also called SSD (Sum of Squared Difference) matching. Note that the shift amount S includes, for example, a global shift amount S1 and a local shift amount S2, as is described below.

The global shift amount estimation unit 501 applies the above-described SSD matching to the whole of the reference image data 522 and the inspection target image data 523, thereby estimating the global shift amount $S1=(s1_x, s1_y)$. The global shift amount estimation unit 501 sends the global shift amount S1 to the correction unit 504.

The local shift amount estimation unit 502 applies the above-described SSD matching to partial regions included in the inspection target image data 523 and first corrected reference image data received from the correction unit 504, thereby estimating the local shift amount S2. For example, the local shift amount estimation unit 502 divides each of the first corrected reference image data and the inspection target image data 523 into M partial regions, and applies the SSD matching to each of the sets of the divided first corrected reference image data and the divided inspection target image data 523 (M is a natural number). The local shift amount estimation unit 502 thus estimates M local shift amounts S2 ($S2_1=(s2_{x1}, s2_{y1})$, $S2_2=(s2_{x2}, s2_{y2})$, ..., $S2_M=(s2_{xM}, s2_{yM})$). The local shift amount estimation unit 502 sends the local shift amounts S2 to the distortion amount estimation unit 503.

The distortion amount estimation unit 503 estimates a distortion amount vector $C_d$ based on the M local shift amounts S2 received from the local shift amount estimation unit 502. The distortion amount vector $C_d$ expresses, by a vector format, a coefficient in a case in which a distortion amount d at a position between corresponding pixels of the two image data is expressed as a polynomial of an arbitrary degree. More specifically, for example, when the distortion amount d is expressed by a polynomial of the second degree, the distortion amount vector $C_d$ is expressed as a column vector formed from six coefficients ($c_{d1}$, $c_{d2}$, $c_{d3}$, $c_{d4}$, $c_{d5}$, $c_{d6}$). In this case, the distortion amount $d=(d_x(x, y), d_y(x, y))$ at the position of a pixel at an arbitrary position (x, y) in the image data is calculated, using the coefficients $c_{d1}$ to $c_{d6}$, in accordance with equations (2) as shown below.

$$\left. \begin{array}{l} d_x(x, y) = c_{dx1}x^2 + c_{dx2}xy + c_{dx3}y^2 + c_{dx4}x + cd_{x5}y + c_{dx6} \\ d_y(x, y) = c_{dy1}x^2 + c_{dy2}xy + c_{dy3}y^2 + c_{dy4}x + c_{dy5}y + c_{dy6} \end{array} \right\} \quad (2)$$

The distortion amount estimation unit 503 sends the estimated distortion amount vector $C_d$ to the correction unit 504. Note that details of the estimation method of the distortion amount vector $C_d$ is described later.

When the global shift amount S1 is received from the global shift amount estimation unit 501, the correction unit 504 applies the global shift amount S1 to the reference image data 522, thereby generating the first corrected reference image data. The correction unit 504 sends the first corrected reference image data to the local shift amount estimation unit 502. Additionally, when the distortion amount vector $C_d$ is received from the distortion amount estimation unit 503, the correction unit 504 applies the distortion amount vector $C_d$ and the global shift amount S1 to the reference image data 522, thereby generating second corrected reference image data. The correction unit 504 sends the second corrected reference image data to the comparison unit 505.

Note that the correction unit 504 may remap (rearrange) the first corrected reference image data and the second corrected reference image data such that they become image data of an integer grid. As the remapping method, not only remapping in the forward direction but also remapping in the reverse direction can be applied. Remapping in the forward direction may be a method of, for example, converting corrected reference image data from a real grid into an integer grid. In addition, remapping in the reverse direction may be a method of obtaining a real luminance value by interpolation from reference image data of an integer grid before correction and converting the obtained real luminance value into corrected reference image data of the integer grid. The remapping in the reverse direction can reduce a quantization error as compared to the remapping in the forward direction while decreasing the calculation amount like the remapping in the forward direction.

When the second corrected reference image data is received from the correction unit 504, the comparison unit 505 compares the second corrected reference image data with the inspection target image data 523 and presents the comparison result to the user. More specifically, for example, the comparison unit 505 maps a luminance value difference on a pixel basis between the second corrected reference image data and the inspection target image data 523 on the XY-plane, and extracts a point where the luminance value difference is larger than a predetermined threshold as a defective portion. The comparison unit 505 presents the image data of the luminance value differences mapped on the XY-plane to the user as the comparison result together with the extracted defective portions.

1.2 Operation

Then, operations of the inspection device according to the first embodiment are described.

1.2.1 Overall Operation of Inspection Device

An overall operation of the inspection device according to the first embodiment will be described first.

Figure 5:
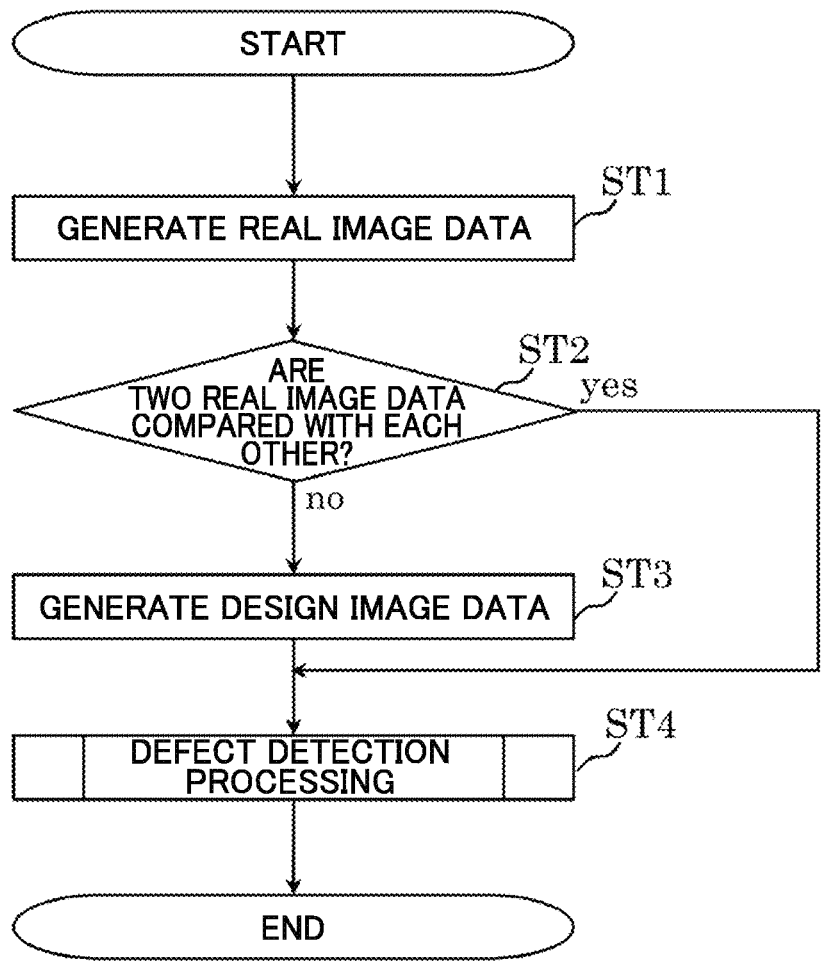
FIG. 5 is a flowchart for explaining an example of an overall operation of the inspection device according to the first embodiment.

FIG. 5 is a flowchart for explaining the overall operation of the inspection device according to the first embodiment. As shown in FIG. 5, the inspection device 1 can cope with both DD comparison and DB comparison.

In step ST1, the mask 114 as the inspection target is placed on the stage 111 of the real image data generation device 10, and is irradiated with a laser beam from the light source 101, thereby generating real image data of the mask 114. The real image data generation device 10 sends the generated real image data to the defect detection device 50.

In step ST2, the inspection device 1 determines whether the inspection method of the mask 114 is DD comparison or DB comparison. When DD comparison is to be executed, that is, when real image data are to be compared (step ST2: yes), the process advances to step ST4 without performing step ST3. On the other hand, when DB comparison is to be executed, that is, when real image data are not to be compared (step ST2: no), the process advances to step ST3.

In step ST3, the design image data generation device 30 generates design image data based on the design data of the mask 114 of the inspection target. The design image data generation device 30 sends the generated design image data to the defect detection device 50.

In step ST4, when executing DD comparison, the defect detection device 50 stores the real image data generated in step ST1 as the reference image data 522 and the inspection target image data 523 in the storage unit 52, and executes defect detection processing. When executing DB comparison, the defect detection device 50 stores the real image data generated in step ST1 as the inspection target image data 523 and the design image data generated in step ST3 as the reference image data 522 in the storage unit 52, and executes defect detection processing.

The overall operation thus finishes.

1.2.2 Defect Detection Operation

The defect detection operation in the above-described overall operation of the inspection device according to the first embodiment is described.

1.2.2.1 Flowchart

Figure 6:
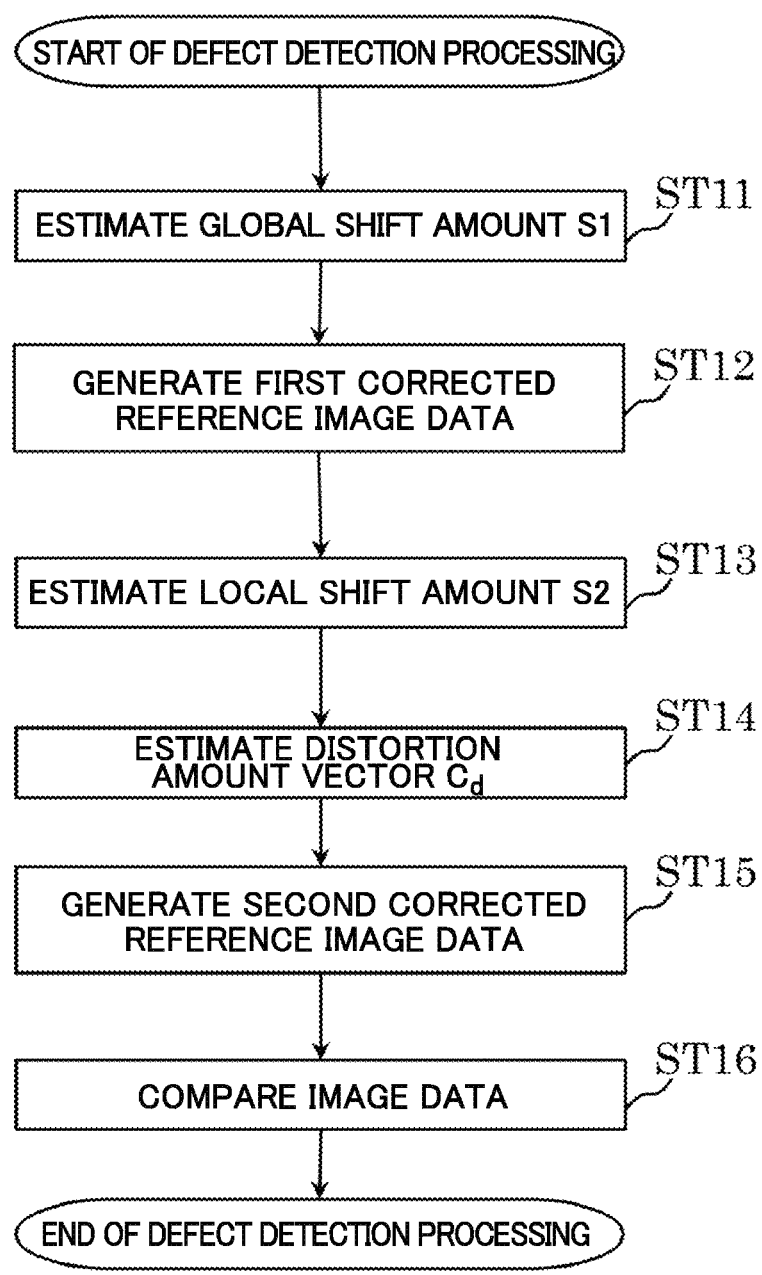
FIG. 6 is a flowchart for explaining an example of a defect detection operation of the defect detection device in the inspection device according to the first embodiment.

The flowchart of the defect detection operation of the defect detection device according to the first embodiment is described with reference to FIG. 6. FIG. 6 explains details of step ST4 shown in FIG. 5.

As shown in FIG. 6, in step ST11, the control unit 51 functions as the global shift amount estimation unit 501 and executes SSD matching for the whole of the reference image data 522 and the inspection target image data 523, thereby estimating the global shift amount S1.

In step ST12, the control unit 51 functions as the correction unit 504 and corrects the reference image data 522 based on the global shift amount S1 estimated in step ST11, thereby generating first corrected reference image data.

In step ST13, the control unit 51 functions as the local shift amount estimation unit 502 and divides each of the first corrected reference image data generated in step ST12 and the inspection target image data 523 into M partial regions. The control unit 51 executes SSD matching for each of the M divided partial regions, thereby estimating M local shift amounts S2.

In step ST14, the control unit 51 functions as the distortion amount estimation unit 503 and estimates the distortion amount vector $C_d$ for the whole first corrected reference image data based on the M local shift amounts S2 estimated in step ST13.

In step ST15, the control unit 51 functions as the correction unit 504 and corrects the reference image data 522 based on the global shift amount S1 estimated in step ST11 and the distortion amount vector $C_d$ estimated in step ST14, thereby generating second corrected reference image data.

In step ST16, the control unit 51 functions as the comparison unit 505, compares the second corrected reference image data generated in step ST15 with the inspection target image data 523, and presents the comparison result to the user.

The defect detection operation thus finishes.

1.2.2.2 Correction Operation

The correction operation in the defect detection operation of the defect detection device according to the first embodiment is described.

Figure 7:
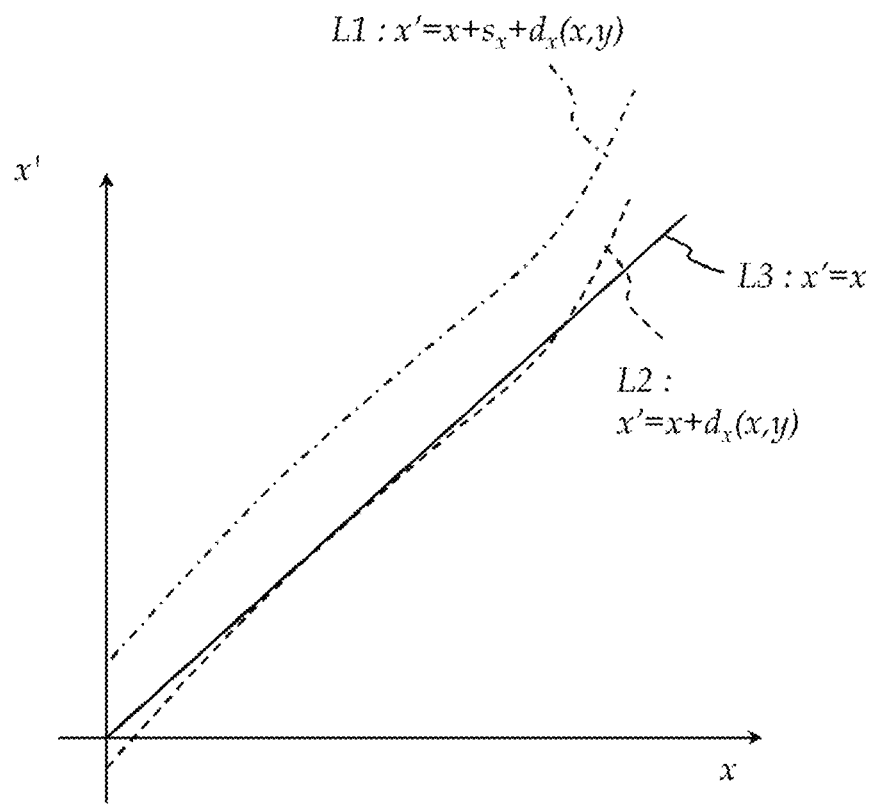
FIG. 7 is a diagram for schematically explaining an example of a correction operation of the defect detection device in the inspection device according to the first embodiment.

FIG. 7 is a diagram for schematically explaining the correction operation for reference image data in the defect detection device according to the first embodiment. FIG. 7 corresponds to steps ST12 and ST15 described concerning FIG. 6. In FIG. 7, as an example, changes in the positions of pixels before and after correction, which occur when correction is performed twice for the reference image data 522, are schematically shown in one dimension (X-axis direction). In the example of FIG. 7, a position x of a pixel of the inspection target image data 523 is plotted along the abscissa, and a position x' of a pixel of the reference image data 522 (including the first corrected reference image data and the second corrected reference image data) corresponding to the inspection target image data 523 is plotted along the ordinate.

As shown in FIG. 7, a position shift as indicated by a line L1 may exist between the reference image data 522 before correction and the inspection target image data 523. That is, the causes of the position shift are roughly classified into a shift amount $s_x$ and a distortion amount $d_x(x, y)$. Using these, the positions x and x' are associated as represented by an equation (3) as shown below.

$$x' = x + s_x + d_x(x, y) \quad (3)$$

Here, the shift amount $s_x$ represents a shift amount evenly generated in the entire image data regardless of the position of a pixel, and the distortion amount $d_x(x, y)$ represents a shift amount (which is nonlinear to the position of a pixel) generated depending on the position of a pixel.

The correction unit 504 removes the above-described shift amount $s_x$, thereby generating the first corrected reference image data. That is, the distortion amount $d_x(x, y)$ may exist between the first corrected reference image data and the inspection target image data 523, as indicated by a line L2.

The correction unit 504 further removes the above-described distortion amount $d_x(x, y)$, thereby generating the second corrected reference image data. When the shift amount $s_x$ and the distortion amount $d_x(x, y)$ are removed, ideally, x'=x, as indicated by a line L3, and the second corrected reference image data and the inspection target image data may completely match.

1.2.2.3 Distortion Amount Estimation Operation

Figure 8:
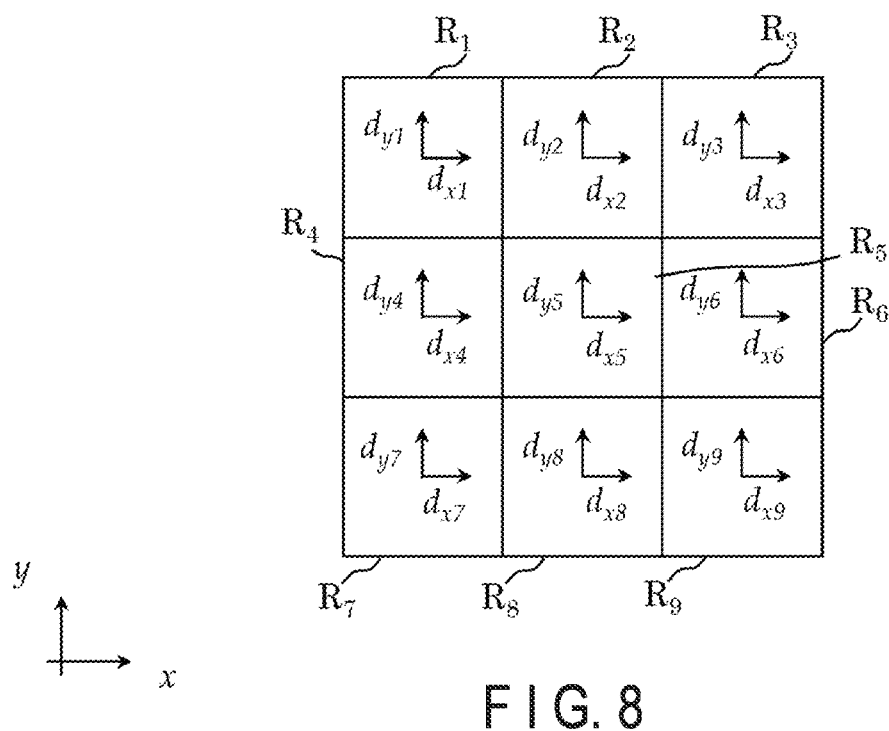
FIG. 8 is a schematic view for explaining an example of a distortion amount estimation operation of the defect detection device in the inspection device according to the first embodiment.

FIG. 8 is a schematic view for explaining the distortion amount estimation operation of the defect detection device in the inspection device according to the first embodiment. FIG. 8 schematically shows the relationship between the local shift amount S2 and the representative distortion amount d in each partial region of the first corrected reference image data. The example of FIG. 8 shows a case in which the first corrected reference image data is divided into M=9 partial regions $R_1, R_2, \ldots, R_9$, and the local shift amounts S2 (($s2_{x1}$, $s2_{y1}$), ($s2_{x2}$, $s2_{y2}$), ..., ($S2_{x9}$, $S2_{y9}$)) are estimated for the partial regions $R_1$ to $R_9$.

As shown in FIG. 8, the distortion amount estimation unit 503 regards the local shift amounts ($s2_{x1}$, $s2_{y1}$) to ($s2_{x9}$, $s2_{y9}$) as distortion amounts ($d_{x1}$, $d_{y1}$) to ($d_{x9}$, $d_{y9}$) at representative positions ($x_1$, $y_1$) to ($x_9$, $y_9$) of the corresponding partial regions $R_1$ to $R_9$, respectively. That is, the distortion amount estimation unit 503 assumes a correspondence relationship represented by equations (4) between the distortion amounts ($d_{x1}$, $d_{y1}$) to ($d_{x9}$, $d_{y9}$) and the local shift amounts ($s2_{x1}$, $s2_{y1}$) to ($s2_{x9}$, $s2_{y9}$).

$$\left. \begin{array}{l} s2_{xk} = d_{xk} \approx d_x(x_k, y_k) \\ s2_{yk} = d_{yk} \approx d_y(x_k, y_k) \end{array} \right\} (1 \leq k \leq M) \quad (4)$$

As described above, in the first embodiment, at the arbitrary position (x, y), the distortion amount d is assumed to satisfy equations (2). For this reason, the first corrected reference image data satisfies equations (2) described above at least at the nine representative positions ($x_1$, $y_1$) to ($x_9$, $y_9$). Hence, when equations (2) are set as simultaneous equations for the nine representative positions ($x_1$, $y_1$) to ($x_9$, $y_9$), we obtain linear equations (5) and (6) as shown below.

$$D_x = ZC_{dx} \Leftrightarrow \begin{pmatrix} d_{x1} \\ d_{x2} \\ \vdots \\ d_{x9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \cdots & \cdots & \cdots & \cdots & \cdots & \cdots \\ x_9^2 & x_9 y_9 & y_9^2 & x_9 & y_9 & 1 \end{pmatrix} \begin{pmatrix} c_{dx1} \\ c_{dx2} \\ \vdots \\ c_{dx6} \end{pmatrix} \quad (5)$$

$$D_y = ZC_{dy} \Leftrightarrow \begin{pmatrix} d_{y1} \\ d_{y2} \\ \vdots \\ d_{y9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \cdots & \cdots & \cdots & \cdots & \cdots & \cdots \\ x_9^2 & x_9 y_9 & y_9^2 & x_9 & y_9 & 1 \end{pmatrix} \begin{pmatrix} c_{dy1} \\ c_{dy2} \\ \vdots \\ c_{dy6} \end{pmatrix} \quad (6)$$

Here, a matrix Z based on the coordinates ($x_1$, $y_1$) to ($x_9$, $y_9$) of the representative positions, and vectors $D_x$ and $D_y$ including the distortion amounts $d_{x1}$ to $d_{x9}$ and $d_{y1}$ to $d_{y9}$ are determined as specific numerical values. For this reason, the distortion amount estimation unit 503 executes calculation represented by equations (7) based on the least square method for equations (5) and (6), thereby estimating distortion amount vectors $C_{dx}$ and $C_{dy}$.

$$C_{dx} = (Z^T Z)^{-1} Z^T D_x \\ C_{dy} = (Z^T Z)^{-1} Z^T D_y \quad (7)$$

Note that for the estimation, to obtain the least square solution by an overdetermined system, the number M of divided partial regions is preferably larger than the number of elements (six in the example of equations (5) and (6)) of the distortion amount vector $C_d$. More preferably, in a case in which a square root m ($m^2 = M$) of the number M of divided regions is determined, the polynomial that forms the distortion amount vector $C_d$ is preferably a polynomial of the (m−1)th degree or less.

1.3 Advantageous Effects According to Embodiment

According to the first embodiment, it is possible to suppress detection errors of defects in an image while reducing the computer load. This effect is described below.

The real image data generation device 10 and the design image data generation device 30 according to the first embodiment generate real image data and design image data, respectively, and send them to the defect detection device 50. Accordingly, the defect detection device 50 can appropriately select image data to be used in accordance with whether to execute DD comparison or DB comparison. That is, when executing DD comparison, the defect detection device 50 can store the real image data as reference image data and inspection target image data. When executing DB comparison, the defect detection device 50 can store the real image data as inspection target image data and design image data as reference image data.

In addition, the global shift amount estimation unit 501 performs SSD matching between the whole region of the reference image data and the whole region of the inspection target image data to estimate the global shift amount S1. Accordingly, the correction unit 504 can generate first corrected reference image data in which the global shift amount S1 in the shift amounts between the reference image data and the inspection target image data is corrected.

In addition, the local shift amount estimation unit 502 performs SSD matching between the partial regions of the first corrected reference image data obtained by applying the global shift amount S1 to the reference image data and the partial regions of the inspection target image data to estimate the local shift amount S2 of each partial region. In general, the distortion amount d is a shift amount that is not evenly distributed in accordance with a position in the image data. However, in the distortion amount d, the component of the shift amount S evenly distributed independently of a position in the image data may be dominant locally. Accordingly, the distortion amount estimation unit 503 regards the local shift amount S2 estimated in each partial region of the image data as a representative distortion amount (that is, the distortion amount at the representative position) in the partial region. For this reason, the distortion amount estimation unit 503 can estimate the distortion amount vector $C_d$ based on the linear equation $D = ZC_d$ representing coordinate transformation. Hence, the correction unit 504 can generate second corrected reference image data in which the distortion amount d between the reference image data and the inspection target image data is further corrected.

Additionally, the distortion amount estimation unit 503 can estimate the distortion amount vector $C_d$ by executing a simple matrix operation represented by equations (7) described above. Here, the size of the matrix Z is (number M of partial regions)×(number of elements of distortion amount vector $C_d$ to be estimated) at most. The correction unit 504 can also generate the second corrected reference image data by simply adding the shift amount S and the distortion amount d shown in equations (2) and (3) described above. Hence, according to the first embodiment, the defect detection device 50 can generate reference image data in which the position shift and the distortion are corrected by a small amount of operation as compared to, for example, an estimation method using a convolution operation typically used as a method of pattern matching.

In addition, the comparison unit 505 compares the luminance values of the pixels of the second corrected reference image data with those of the inspection target image data 523. As described above, the second corrected reference image data can accurately remove the shift amount S and the distortion amount d by a small amount of operation. This allows the comparison unit 505 to detect, from the inspection target image data, a peculiar point that does not exist in the reference image data as a defect and suppress detection errors. This effect will be described with reference to FIGS. 9, 10, 11, 12, and 13.

Figure 9:
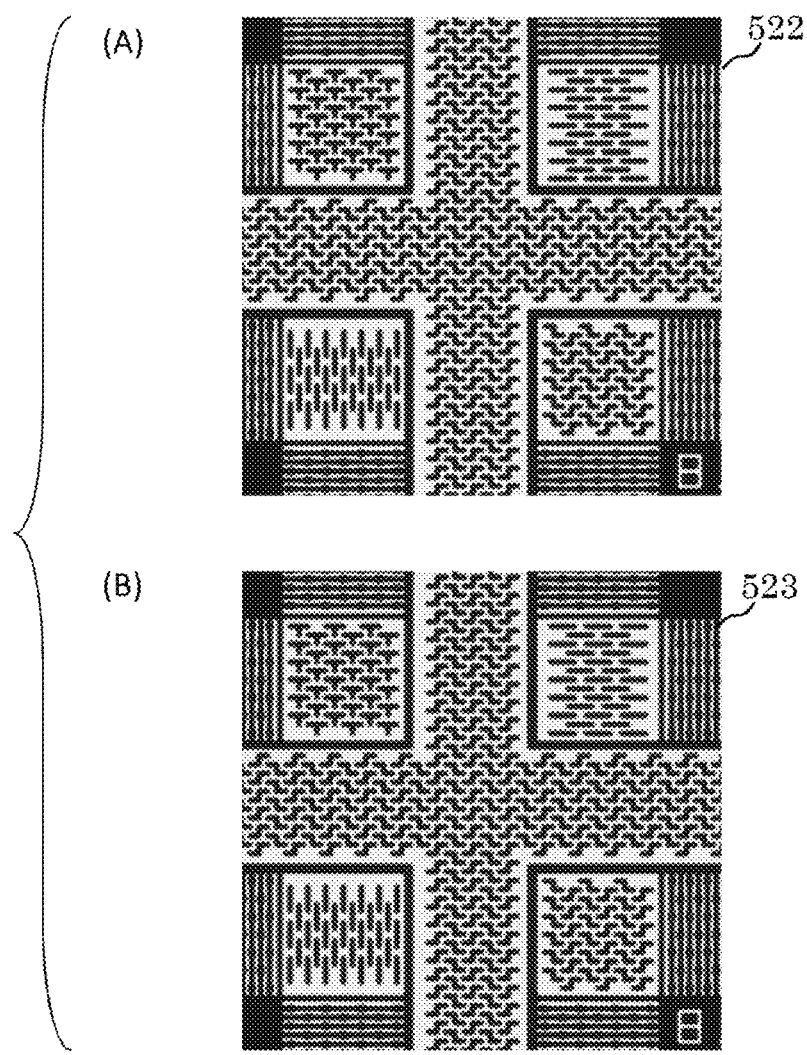
FIG. 9 is a schematic view for explaining an example of reference image data and inspection target image data according to the first embodiment.
Figure 10:
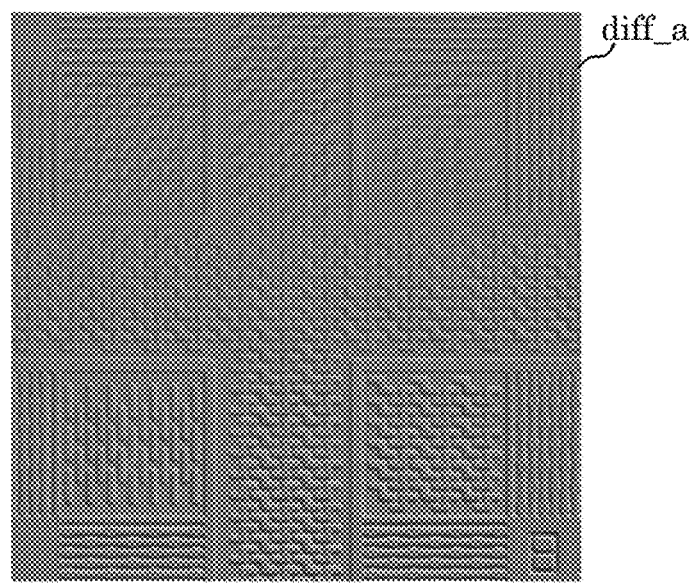
FIG. 10 is a schematic view for explaining an example of differential image data between first corrected reference image data and inspection target image data according to the first embodiment.
Figure 11:
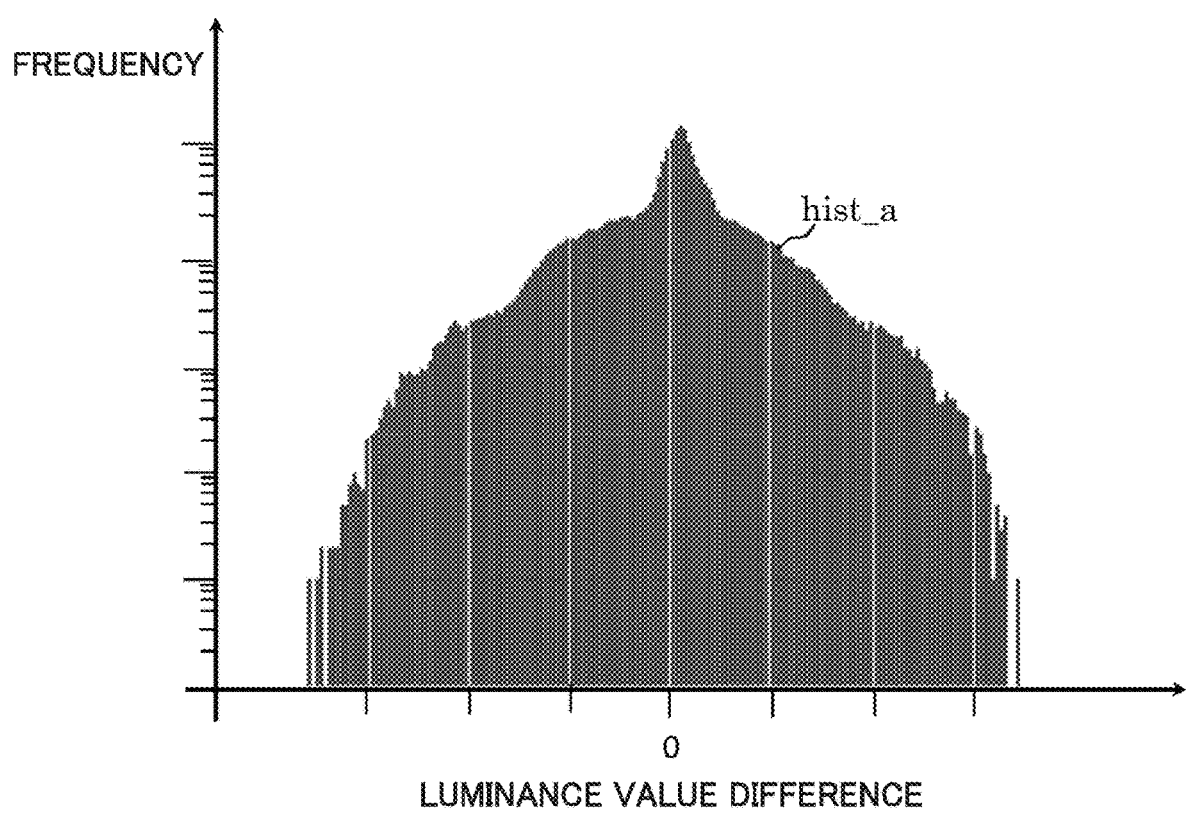
FIG. 11 is a histogram for explaining the differential image data between the first corrected reference image data and the inspection target image data according to the first embodiment.
Figure 12:
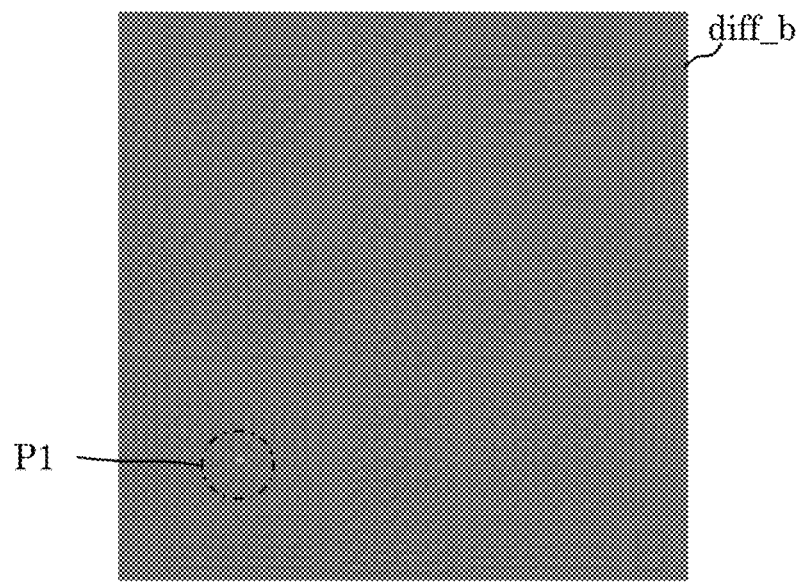
FIG. 12 is a schematic view for explaining an example of differential image data between second corrected reference image data and inspection target image data according to the first embodiment.
Figure 13:
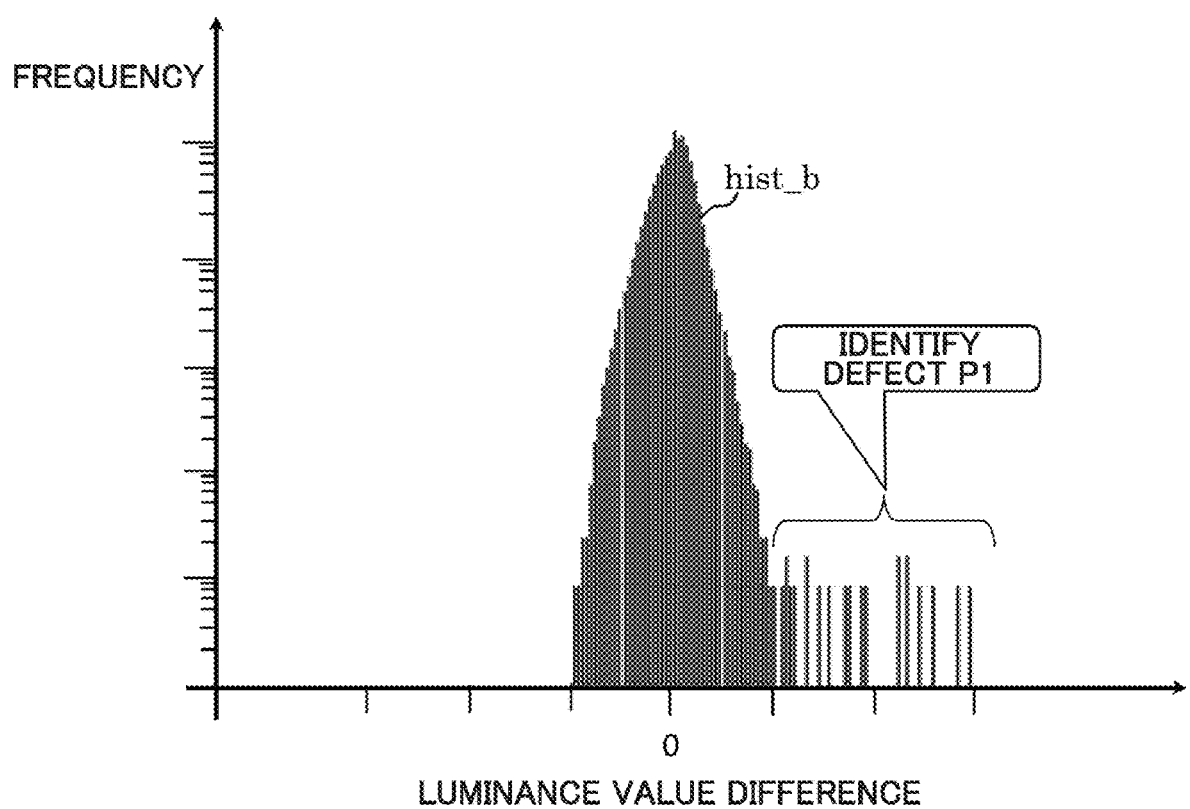
FIG. 13 is a histogram for explaining the differential image data between the second corrected reference image data and the inspection target image data according to the first embodiment.

FIG. 9 is a schematic view for explaining examples of reference image data and inspection target image data according to the first embodiment. Upper portion of FIG. 9 (FIG. 9(A)) and lower portion of FIG. 9 (FIG. 9B) show the reference image data 522 and the inspection target image data 523, respectively. The example of FIG. 9 shows a case in which the inspection target image data 523 has a small position shift and distortion relative to the reference image data 522, and a defect that cannot visually be confirmed exists. FIG. 10 is a schematic view for explaining the differential image data between the first corrected reference image data and the inspection target image data according to the first embodiment. FIG. 11 is a histogram showing the luminance difference of the differential image data shown in FIG. 10. FIG. 12 is a schematic view for explaining the differential image data between the second corrected reference image data and the inspection target image data according to the first embodiment. FIG. 13 is a histogram showing the luminance difference of the differential image data shown in FIG. 12. FIGS. 10 and 12 show whether a defect can visually be recognized by calculating the difference before the after correction. In FIGS. 11 and 13, the luminance value difference is plotted along the abscissa, and the frequency is plotted along the ordinate, thereby showing whether the presence/absence of a defect can be identified.

As shown in FIG. 9, a shift that is too small to visually recognize exists between the reference image data 522 and the inspection target image data 523. When the global shift amount S1 between the reference image data 522 and the inspection target image data 523 is estimated, and the first corrected reference image data is created, differential image data diff_a as shown in FIG. 10 and a histogram hist_a as shown in FIG. 11 are obtained.

As described above, the example of FIG. 9 shows a case in which a significant defect exists in the inspection target image data 523. For this reason, a significant luminance value difference preferably appears in the differential image data diff_a and the histogram hist_a. However, as shown in FIG. 10, since the pattern of the reference image data 522 that should originally be removed appears as a difference in the differential image data diff_a, it is difficult to visually confirm whether a defect exists. Additionally, as shown in FIG. 11, in the histogram hist_a, the distribution continuously expands up to a region where the luminance value difference is large. For this reason, it is difficult to specify the distribution showing the defect based on the histogram hist_a. Hence, concerning the differential image data diff_a and the histogram hist_a, there is a possibility of erroneously determining that the image data is normal even if a defect exists or a possibility of erroneously determining that a defect exists even if the image data is normal.

On the other hand, when the distortion amount d between the reference image data 522 and the inspection target image data 523 is further estimated based on the local shift amount S2, and the second corrected reference image data is created, differential image data diff_b as shown in FIG. 12 and a histogram hist_b as shown in FIG. 13 are obtained. As shown in FIG. 12, in the differential image data diff_b, the pattern of the reference image data 522 almost disappears, and a significant luminance value difference P1 can visually be recognized. Additionally, as shown in FIG. 13, the histogram hist_b is continuously distributed to a region where the luminance value difference is small. A region where the luminance value difference is discontinuously large, which corresponds to the significant luminance value difference P1, appears in the histogram hist_b. For this reason, in the differential image data diff_b and the histogram hist_b, it is possible to identify a significant defect while removing the shift of image data caused by the position shift or distortion. Note that the differential image data diff_b and the histogram hist_b exhibit the same performance as differential image data and a histogram obtained by, for example, the above-described estimation method using the convolution operation. Hence, according to the first embodiment, the computer load can be reduced without lowering the defect detection accuracy.

1.4 Modification of First Embodiment

Note that the first embodiment is not limited to the above-described example, and various modifications can be made.

In the above-described first embodiment, a case in which a scanner configured to generate image data based on an optical image is used as the real image data generation device 10 has been described. However, the first embodiment is not limited to this. For example, a SEM (Scanning Electron Microscope) configured to generate image data based on an electron image may be applied as the real image data generation device 10. In this case, the real image data generation device 10 can send an electron image of a semiconductor device to which a pattern is transferred by the mask 114 as image data to the defect detection device 50, instead of sending an optical image of the mask 114 as image data to the defect detection device 50, as described above in the first embodiment.

Note that in the following description, a description of the equivalent components and operations as in the first embodiment is omitted, and components and operations different from the first embodiment is mainly described.

1.4.1 Hardware Configuration of Real Image Data Generation Device

The hardware configuration of the real image data generation device according to a modification of the first embodiment is described.

FIG. 14 is a schematic view for explaining the hardware configuration of the real image data generation device in the inspection device according to the modification of the first embodiment. In FIG. 14, a SEM capable of generating an electron image of a pattern transferred onto a semiconductor device 129 as real image data is shown as an example of the real image data generation device 10.

As shown in FIG. 14, the real image data generation device 10 includes, for example, an electron source 121, a plurality of focusing lenses 122 and 123, a plurality of scanning coils 124 and 125, an objective lens 126, a stage 127, and a sensor 128, which are stored in a chamber 120.

An electron beam emitted by the electron source 121 is accelerated and then focused by the focusing lenses 122 and 123 and the objective lens 126 as an electron spot on the surface of the semiconductor device 129 placed on the stage 127. The scanning coils 124 and 125 control the position of the electron spot on the semiconductor device 129.

The sensor 128 detects, for example, electrons reflected by the semiconductor device 129. The real image data generation device 10 processes the detected electrons by a processor (not shown) to generate real image data concerning the pattern on the semiconductor device 129. The generated real image data is sent to the defect detection device 50.

1.4.2 Functional Configuration of Defect Detection Device

The functional configuration of the defect detection device according to the modification of the first embodiment is described.

Figure 15:
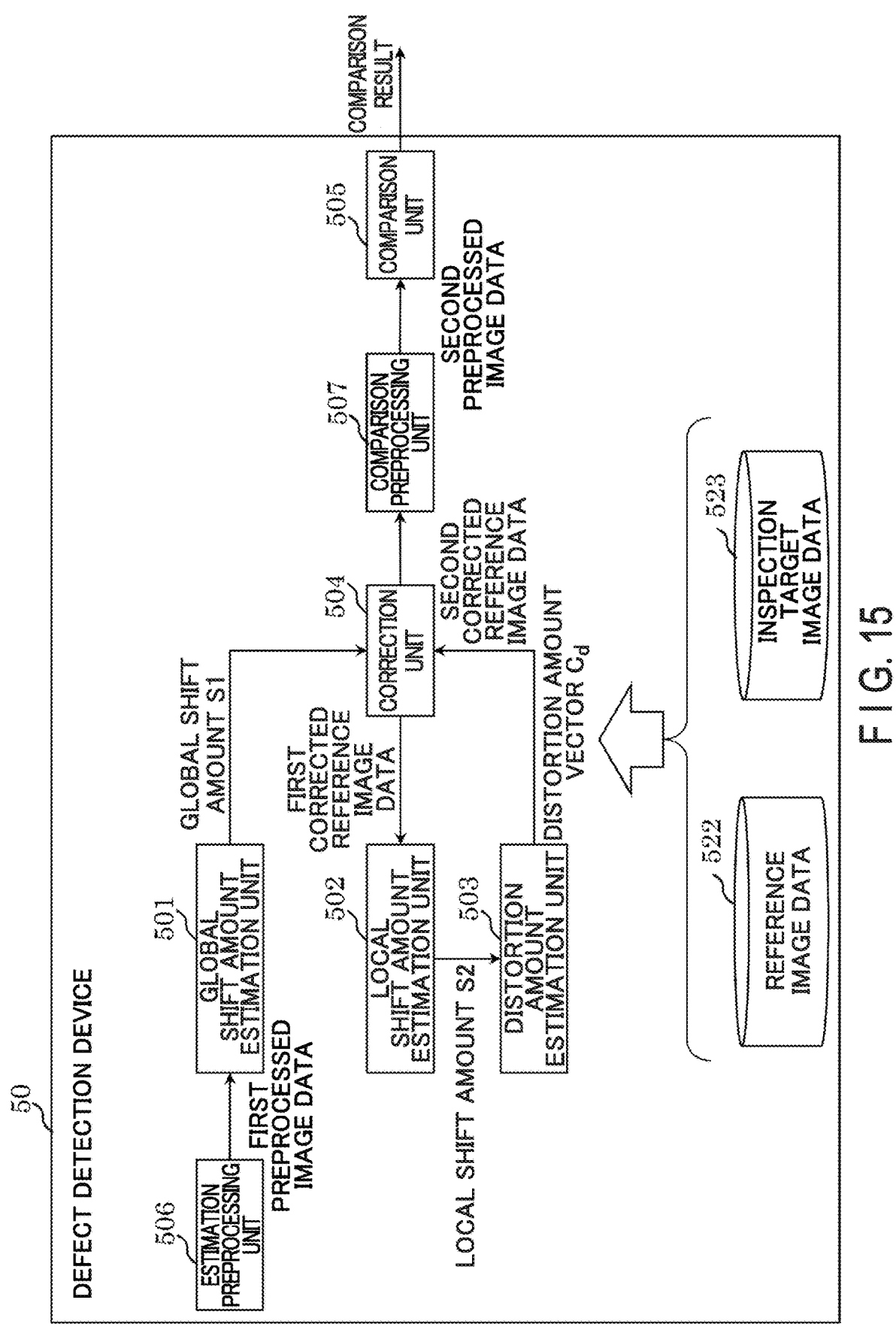
FIG. 15 is a block diagram for explaining an example of a functional configuration of a defect detection device in the inspection device according to the modification of the first embodiment.

FIG. 15 is a block diagram for explaining the functional configuration of the defect detection device according to the modification of the first embodiment. FIG. 15 corresponds to FIG. 4 described in the first embodiment. As shown in FIG. 15, the defect detection device 50 functions as a computer further including an estimation preprocessing unit 506 and a comparison preprocessing unit 507 in addition to the global shift amount estimation unit 501, the local shift amount estimation unit 502, the distortion amount estimation unit 503, the correction unit 504, and the comparison unit 505 described concerning FIG. 4.

Before the estimation of the global shift amount S1 by the global shift amount estimation unit 501, the estimation of the local shift amount S2 by the local shift amount estimation unit 502, and the estimation of the distortion amount vector $C_d$ by the distortion amount estimation unit 503, the estimation preprocessing unit 506 performs estimation preprocessing for the reference image data 522 and the inspection target image data 523 to be used for these estimations. As the result of the estimation preprocessing, the estimation preprocessing unit 506 generates first preprocessed image data and sends it to, for example, the global shift amount estimation unit 501. The first preprocessed image data includes first preprocessed reference image data and first preprocessed inspection target image data.

Before the comparison by the comparison unit 505, the comparison preprocessing unit 507 performs comparison preprocessing for the second corrected reference image data and the inspection target image data 523 to be used for the comparison. As the result of the comparison preprocessing, the comparison preprocessing unit 507 generates second preprocessed image data and sends it to, for example, the comparison unit 505. The second preprocessed image data includes second preprocessed reference image data and second preprocessed inspection target image data.

Both the estimation preprocessing and the comparison preprocessing mainly function as a noise filter that reduces noise included in the two image data. More specifically, for example, Gaussian blur processing is applicable as the estimation preprocessing, and NLM (Non-Local Means) processing is applicable as the comparison preprocessing.

1.4.3 Defect Detection Operation

The defect detection operation of the defect detection device according to the modification of the first embodiment is described.

Figure 16:
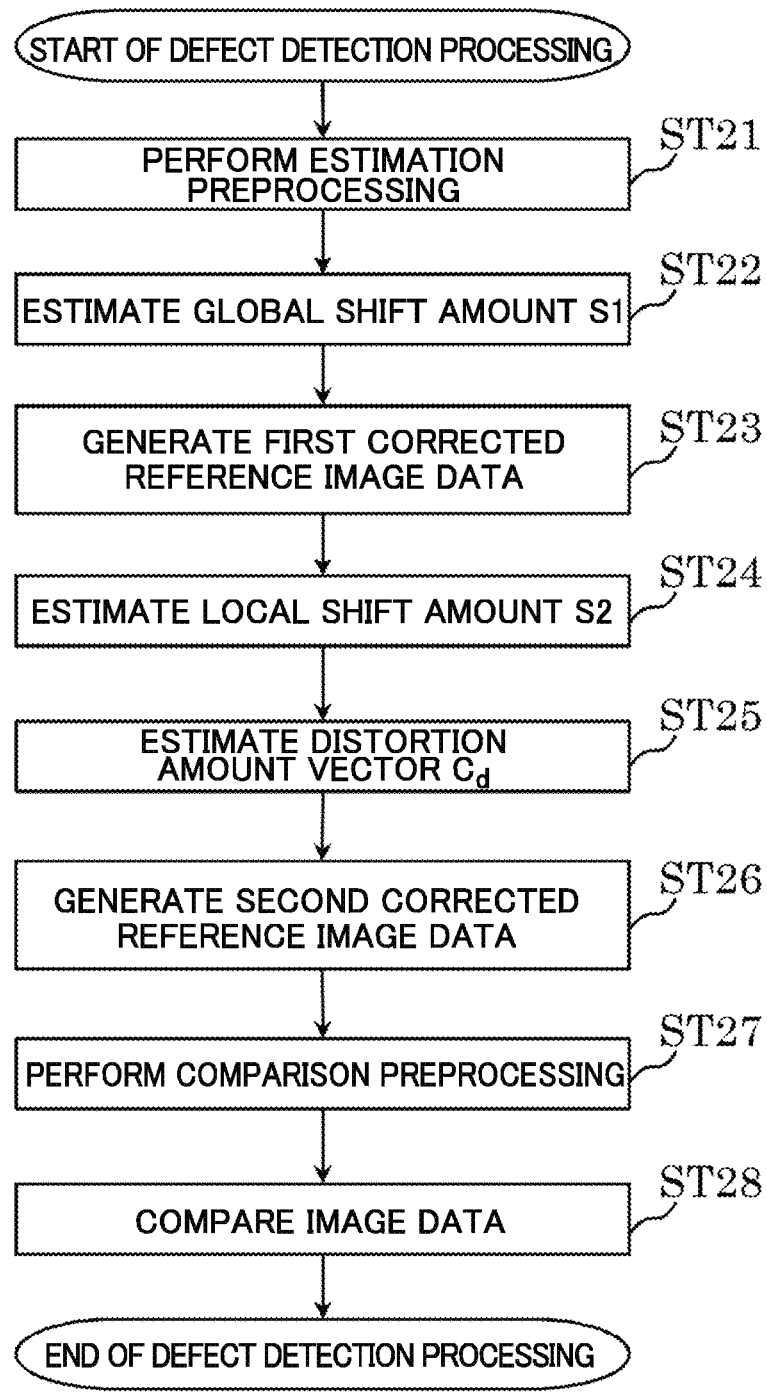
FIG. 16 is a flowchart for explaining an example of a defect detection operation of the defect detection device in the inspection device according to the modification of the first embodiment.

FIG. 16 is a flowchart for explaining the defect detection operation of the defect detection device according to the modification of the first embodiment. FIG. 16 corresponds to FIG. 6 described in the first embodiment.

As shown in FIG. 16, in step ST21, the control unit 51 functions as the estimation preprocessing unit 506 and executes estimation preprocessing. More specifically, the control unit 51 applies Gaussian blur processing to each of the reference image data 522 and the inspection target image data 523, thereby generating first preprocessed reference image data and first preprocessed inspection target image data.

In step ST22, the control unit 51 functions as the global shift amount estimation unit 501 and executes SSD matching for the whole of the first preprocessed reference image data and the first preprocessed inspection target image data 523, thereby estimating the global shift amount S1.

In step ST23, the control unit 51 functions as the correction unit 504 and corrects the first preprocessed reference image data based on the global shift amount S1 estimated in step ST22, thereby generating first corrected reference image data.

In step ST24, the control unit 51 functions as the local shift amount estimation unit 502 and divides each of the first corrected reference image data generated in step ST23 and the first preprocessed inspection target image data into M partial regions. The control unit 51 executes SSD matching for each of the M divided partial regions, thereby estimating M local shift amounts S2.

In step ST25, the control unit 51 functions as the distortion amount estimation unit 503 and estimates the distortion amount vector $C_d$ for the whole first corrected reference image data based on the M local shift amounts S2 estimated in step ST24.

In step ST26, the control unit 51 functions as the correction unit 504 and corrects the reference image data 522 based on the global shift amount S1 estimated in step ST22 and the distortion amount vector $C_d$ estimated in step ST25, thereby generating second corrected reference image data.

In step ST27, the control unit 51 functions as the comparison preprocessing unit 507 and executes comparison preprocessing. More specifically, the control unit 51 applies NLM processing to each of the second corrected reference image data and the inspection target image data 523, thereby generating second preprocessed reference image data and second preprocessed inspection target image data. Note that the noise removal processing (for example, Gaussian blur processing) applied when generating the first preprocessed correction data and the noise removal processing (for example, NLM processing) applied when generating the second preprocessed correction data are not repetitively applied.

In step ST28, the control unit 51 functions as the comparison unit 505, compares the second preprocessed reference image data generated in step ST26 with the second preprocessed inspection target image data, and presents the comparison result to the user.

The defect detection operation thus finishes.

1.4.4 Advantageous Effects According to Modification

According to the modification of the first embodiment, it is possible to execute defect detection processing even in a case in which an electron image is generated as real image data. This advantageous effects are described below with reference to FIGS. 17, 18, 19, 20, and 21.

Figure 18:
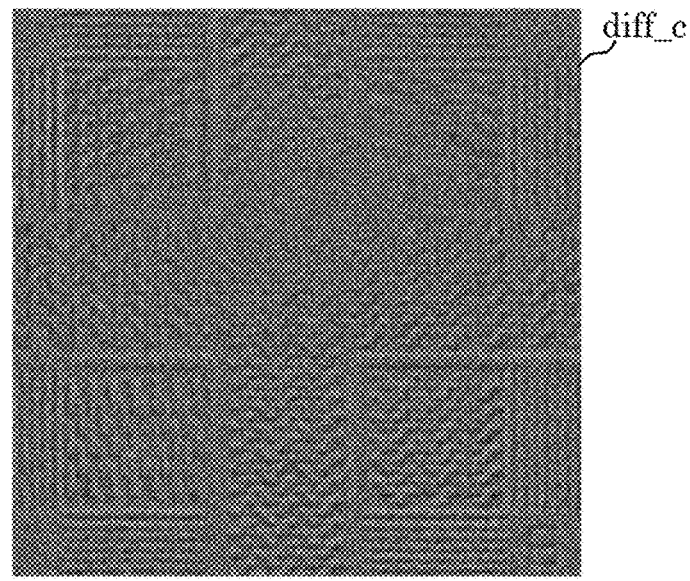
FIG. 18 is a schematic view for explaining an example of differential image data between first corrected reference image data and inspection target image data according to the modification of the first embodiment.
Figure 19:
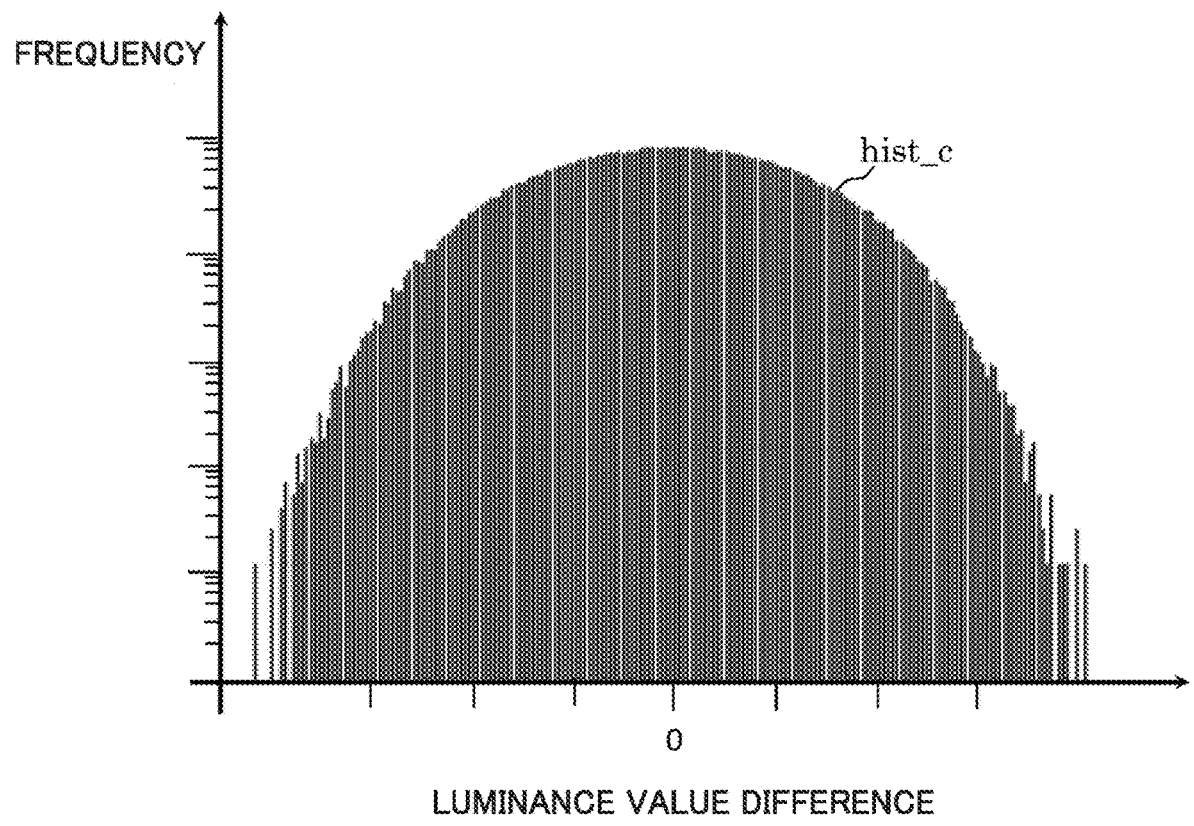
FIG. 19 is a histogram for explaining the differential image data between the first corrected reference image data and the inspection target image data according to the modification of the first embodiment.
Figure 20:
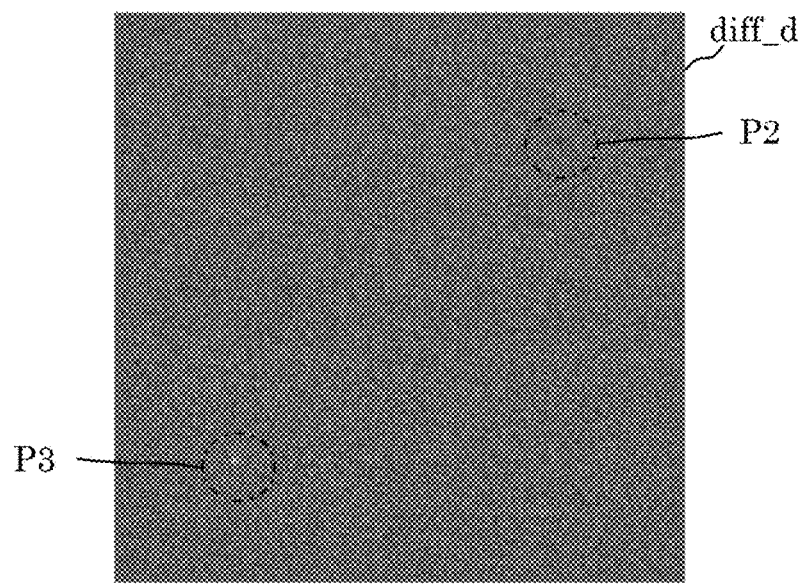
FIG. 20 is a schematic view for explaining an example of differential image data between second corrected reference image data and inspection target image data according to the modification of the first embodiment.
Figure 21:
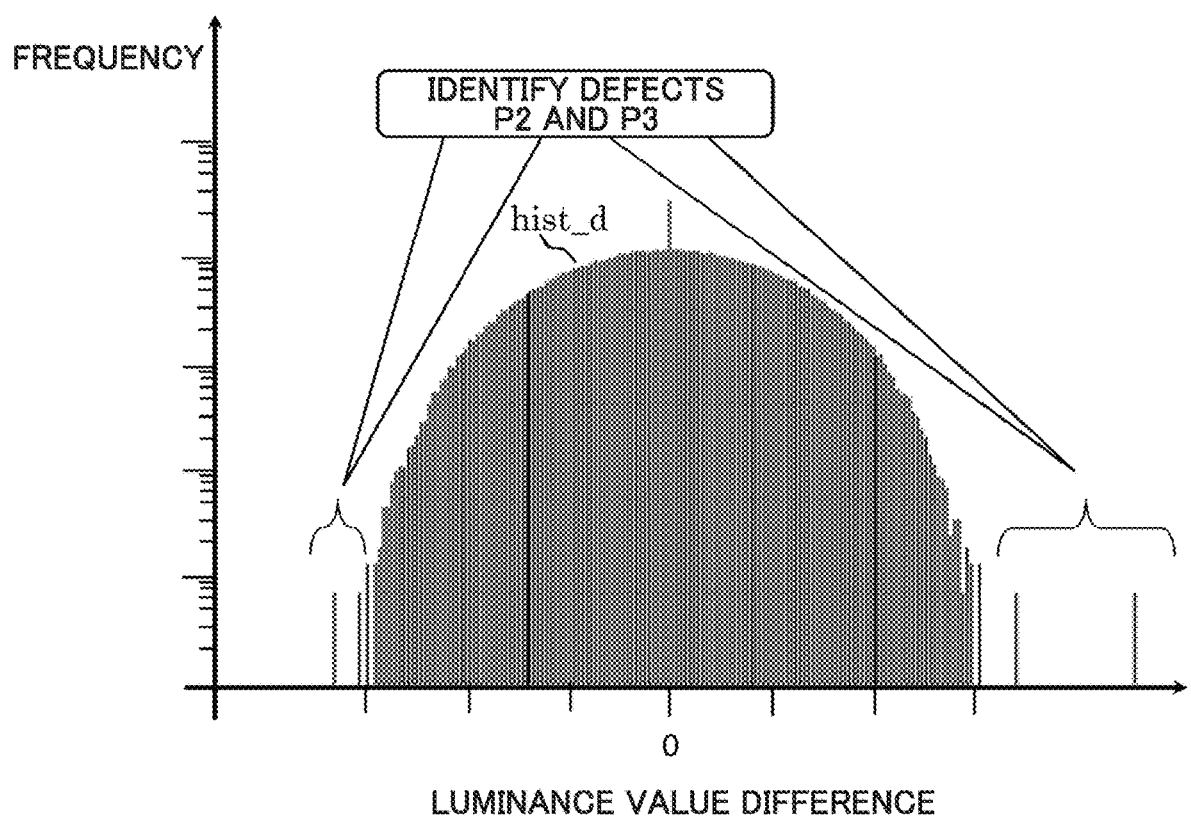
FIG. 21 is a histogram for explaining the differential image data between the second corrected reference image data and the inspection target image data according to the modification of the first embodiment.

FIG. 17 is a schematic view for explaining examples of reference image data and inspection target image data according to the modification of the first embodiment. Upper portion of the FIG. 17 (FIG. 17A) and lower portion of the FIG. 17 (FIG. 17) show the reference image data 522 and the inspection target image data 523, respectively, in a case in which a SEM is applied as the real image data generation device 10. The example of FIG. 17 shows a case in which the inspection target image data 523 has a small position shift and distortion relative to the reference image data 522, and a defect that cannot visually be confirmed exists. FIG. 18 is a schematic view for explaining the differential image data between the first corrected reference image data and the inspection target image data 523 according to the modification of the first embodiment. FIG. 19 is a histogram showing the luminance difference of the differential image data shown in FIG. 18. FIG. 20 is a schematic view for explaining the differential image data between the second corrected reference image data and the inspection target image data 523 according to the modification of the first embodiment. FIG. 21 is a histogram showing the luminance difference of the differential image data shown in FIG. 20. FIGS. 18 and 20 show whether a defect can visually be recognized by calculating the difference before the after correction. In FIGS. 19 and 21, the luminance value difference is plotted along the abscissa, and the frequency is plotted along the ordinate, thereby showing whether the presence/absence of a defect can be identified.

As shown in FIG. 17, a shift that is too small to visually recognize exists between the reference image data 522 and the inspection target image data 523. In addition, both the reference image data 522 and the inspection target image data 523 include noise in the entire image data. When the global shift amount S1 between the reference image data 522 and the inspection target image data 523 is estimated, and the first corrected reference image data is created, differential image data diff_c as shown in FIG. 18 and a histogram hist_c as shown in FIG. 19 are obtained.

As described above, the example of FIG. 17 shows a case in which a significant defect exists in the inspection target image data 523. For this reason, a significant luminance value difference preferably appears in the differential image data diff_c and the histogram hist_c. However, as shown in FIG. 18, since the pattern of the reference image data 522 that should originally be removed appears as a difference in the differential image data diff_c together with noise, it is difficult to visually confirm whether a defect exists. Additionally, as shown in FIG. 19, in the histogram hist_c, the distribution continuously expands up to a region where the luminance value difference is large due to the influence of the above-described residual pattern and noise. For this reason, it is difficult to specify the distribution showing the defect based on the histogram hist_c. Hence, concerning the differential image data diff_c and the histogram hist_c, there is a possibility of erroneously determining that the image data is normal even if a defect exists or a possibility of erroneously determining that a defect exists even if the image data is normal.

On the other hand, when the distortion amount d between the reference image data 522 and the inspection target image data 523 is further estimated based on the local shift amount S2, and the second corrected reference image data is created, differential image data diff_d as shown in FIG. 20 and a histogram hist_d as shown in FIG. 21 are obtained. As shown in FIG. 20, in the differential image data diff_d, the pattern of the reference image data 522 almost disappears, and significant luminance value differences P2 and P3 can visually be recognized. Additionally, as shown in FIG. 21, the histogram hist_d is continuously distributed to a region where the luminance value difference is small. Regions where the luminance value difference is discontinuously large, which corresponds to the significant luminance value differences P2 and P3, appear in the histogram hist_d. For this reason, in the differential image data diff_d and the histogram hist_d, it is possible to identify a significant defect while removing the shift of image data caused by the position shift or distortion.

Hence, even in a case in which electron image data generated by a SEM is input to the defect detection device 50, the equivalent effect as in the first embodiment can be obtained.

2. Second Embodiment

A inspection device according to a second embodiment is described.

In the second embodiment, the unevenness of luminance values existing between two image data is removed, thereby further raising the defect detection accuracy, in addition to the first embodiment. In the following description, a description of the equivalent components and operations as in the first embodiment is omitted, and components and operations different from the first embodiment is mainly described.

2.1 Functional Configuration of Defect Detection Device

The functional configuration of a defect detection device according to the second embodiment is described.

Figure 22:
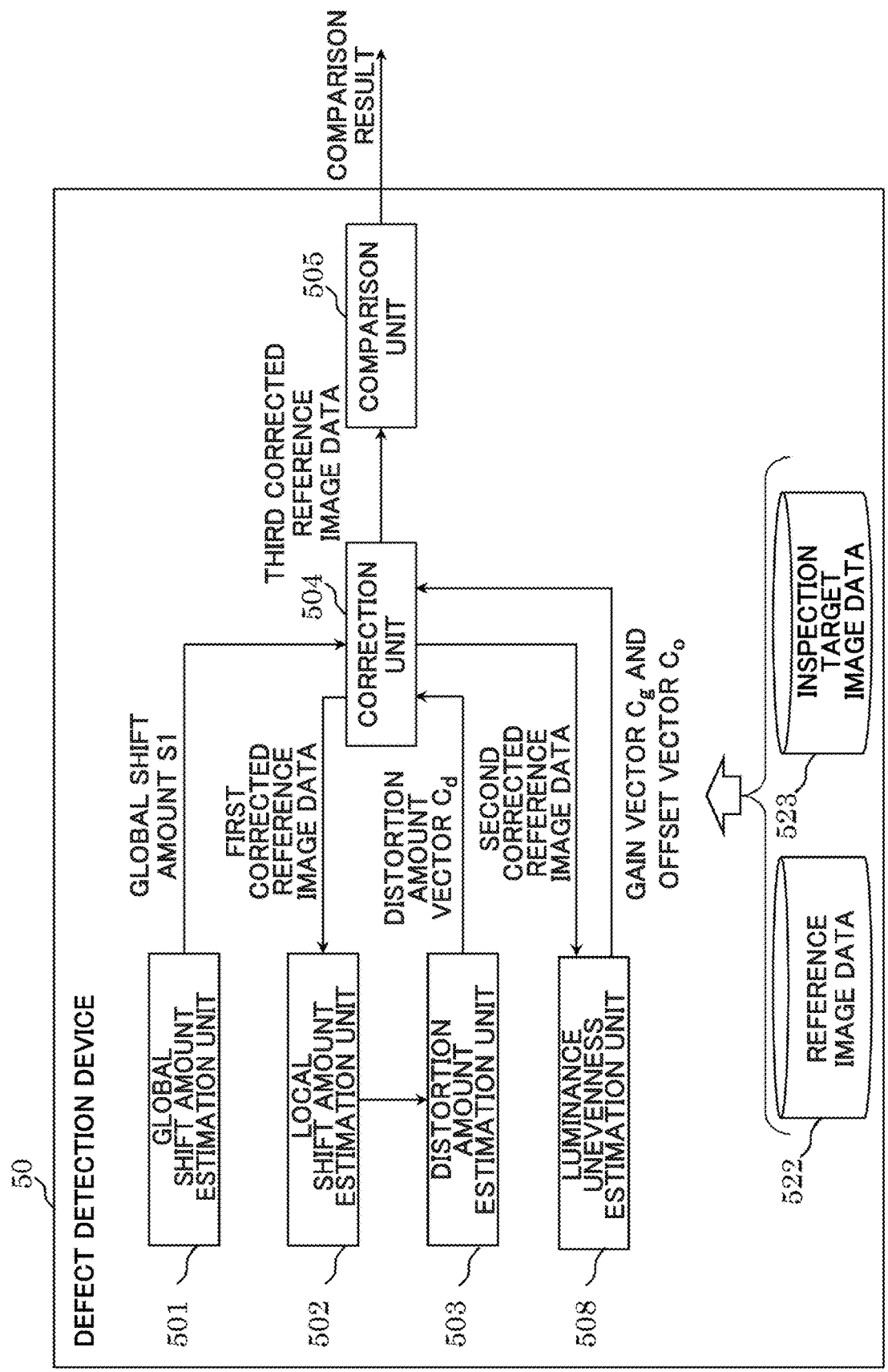
FIG. 22 is a block diagram for explaining an example of a functional configuration of a defect detection device in an inspection device according to a second embodiment.

FIG. 22 is a block diagram for explaining the functional configuration of the defect detection device according to the second embodiment. FIG. 22 corresponds to FIG. 4 described in the first embodiment. As shown in FIG. 22, a defect detection device 50 functions as a computer further including a luminance unevenness estimation unit 508 in addition to a global shift amount estimation unit 501, a local shift amount estimation unit 502, a distortion amount estimation unit 503, a correction unit 504, and a comparison unit 505 described concerning FIG. 4.

When second corrected reference image data is received from the correction unit 504, the luminance unevenness estimation unit 508 estimates a gain vector $C_g$ and an offset vector $C_o$, which can correct luminance unevenness between the second corrected reference image data and inspection target image data 523.

In the second embodiment, the unevenness of luminance values between reference image data 522 and the inspection target image data 523 is corrected in accordance with an equation (8) as shown below.

$$I_S(x,y) \approx I_R'(x,y) = b_g(x,y)I_R(x,y) + b_o(x,y) \quad (8)$$

Where $b_g(x, y)$ and $b_o(x, y)$ are coefficients that correct the luminance value difference between the two image data at a position (x, y) and are called a global gain and a global offset, respectively. The gain vector $C_g$ and the offset vector $C_o$ express, by a vector format, coefficients in a case in which each of the global gain $b_g(x, y)$ and the global offset $b_o(x, y)$ is expressed as a polynomial of an arbitrary degree. More specifically, for example, when the global gain $b_g(x, y)$ is expressed by a polynomial of the second degree, the gain vector $C_g$ is expressed as a column vector formed from six coefficients $(c_{g1}, c_{g2}, c_{g3}, c_{g4}, c_{g5}, c_{g6})$. Similarly, when the global offset $b_o(x, y)$ is expressed by a polynomial of the second degree, the offset vector $C_o$ is expressed as a column vector formed from six coefficients $(c_{o1}, c_{o2}, c_{o3}, c_{o4}, c_{o5}, c_{o6})$. In this case, the global gain $b_g(x, y)$ and the global offset $b_o(x, y)$ are calculated, using the coefficients $c_{g1}$ to $c_{g6}$ and $c_{o1}$ to $c_{o6}$, in accordance with equations (9) as shown below.

$$\left. \begin{array}{l} b_g(x, y) = c_{g1}x^2 + c_{g2}xy + c_{g3}y^2 + c_{g4}x + c_{g5}y + c_{g6} \\ b_o(x, y) = c_{o1}x^2 + c_{o2}xy + c_{o3}y^2 + c_{o4}x + c_{o5}y + c_{o6} \end{array} \right\} \quad (9)$$

The luminance unevenness estimation unit 508 sends the estimated gain vector $C_g$ and the estimated offset vector $C_o$ to the correction unit 504. Note that details of the estimation method of the gain vector $C_g$ and the offset vector $C_o$ is described later.

When the gain vector $C_g$ and the offset vector $C_o$ are received from the luminance unevenness estimation unit 508, the correction unit 504 applies the gain vector $C_g$ and the offset vector $C_o$, a distortion amount vector $C_d$, and a global shift amount S1 to the reference image data 522, thereby generating third corrected reference image data. The correction unit 504 sends the third corrected reference image data to the comparison unit 505.

When the third corrected reference image data is received from the correction unit 504, the comparison unit 505 compares the third corrected reference image data with the inspection target image data 523 and presents the comparison result to the user.

2.2 Defect Detection Operation

The defect detection operation of the defect detection device according to the second embodiment is described.

Figure 23:
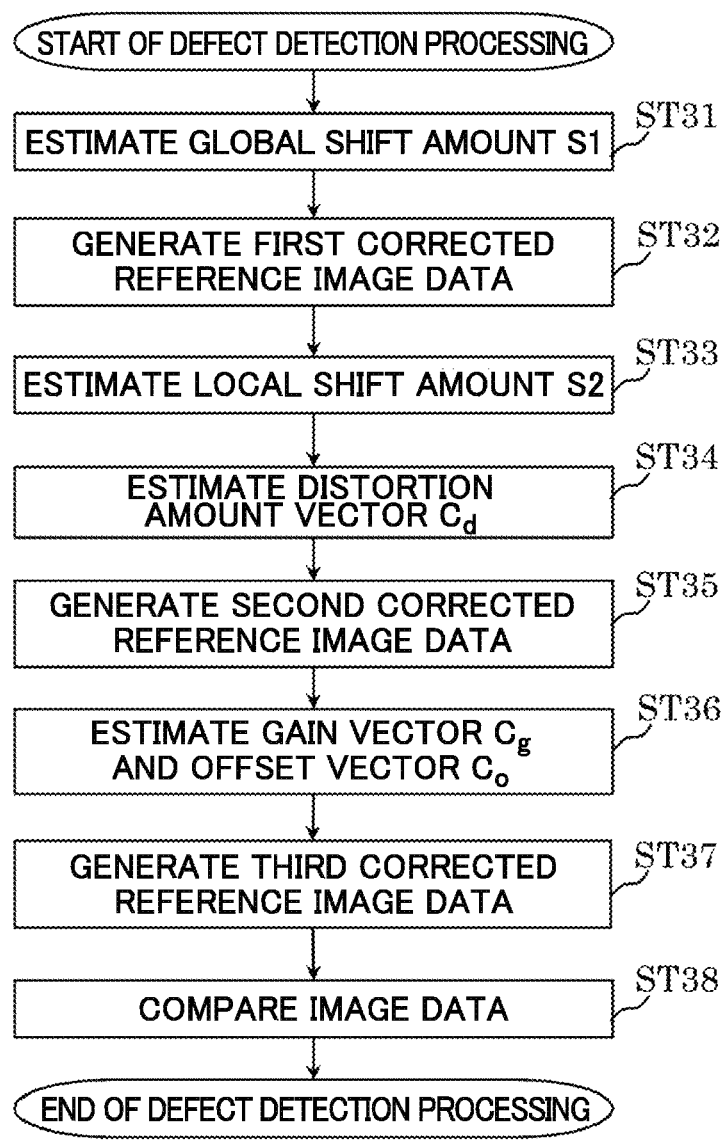
FIG. 23 is a flowchart for explaining an example of a defect detection operation of the defect detection device in the inspection device according to the second embodiment.

FIG. 23 is a flowchart for explaining the defect detection operation of the defect detection device according to the second embodiment. FIG. 23 corresponds to FIG. 6 described in the first embodiment.

As shown in FIG. 23, the operation in steps ST31 to ST35 is the equivalent as that in steps ST11 to ST15 described concerning FIG. 6, and a description thereof is omitted.

In step ST36, a control unit 51 functions as the luminance unevenness estimation unit 508 and executes luminance unevenness estimation processing. More specifically, the control unit 51 estimates the gain vector $C_g$ and the offset vector $C_o$, which can correct the unevenness of luminance values between the second corrected reference image data and the inspection target image data 523.

In step ST37, the control unit 51 functions as the correction unit 504 and corrects the reference image data 522 based on the global shift amount S1 estimated in step ST31, the distortion amount vector $C_d$ estimated in step ST34, and the gain vector $C_g$ and the offset vector $C_o$ estimated in step ST36, thereby generating third corrected reference image data.

In step ST38, the control unit 51 functions as the comparison unit 505, compares the third corrected reference image data generated in step ST37 with the inspection target image data 523, and presents the comparison result to the user.

The defect detection operation thus finishes.

2.3 Luminance Unevenness Estimation Operation

Figure 24:
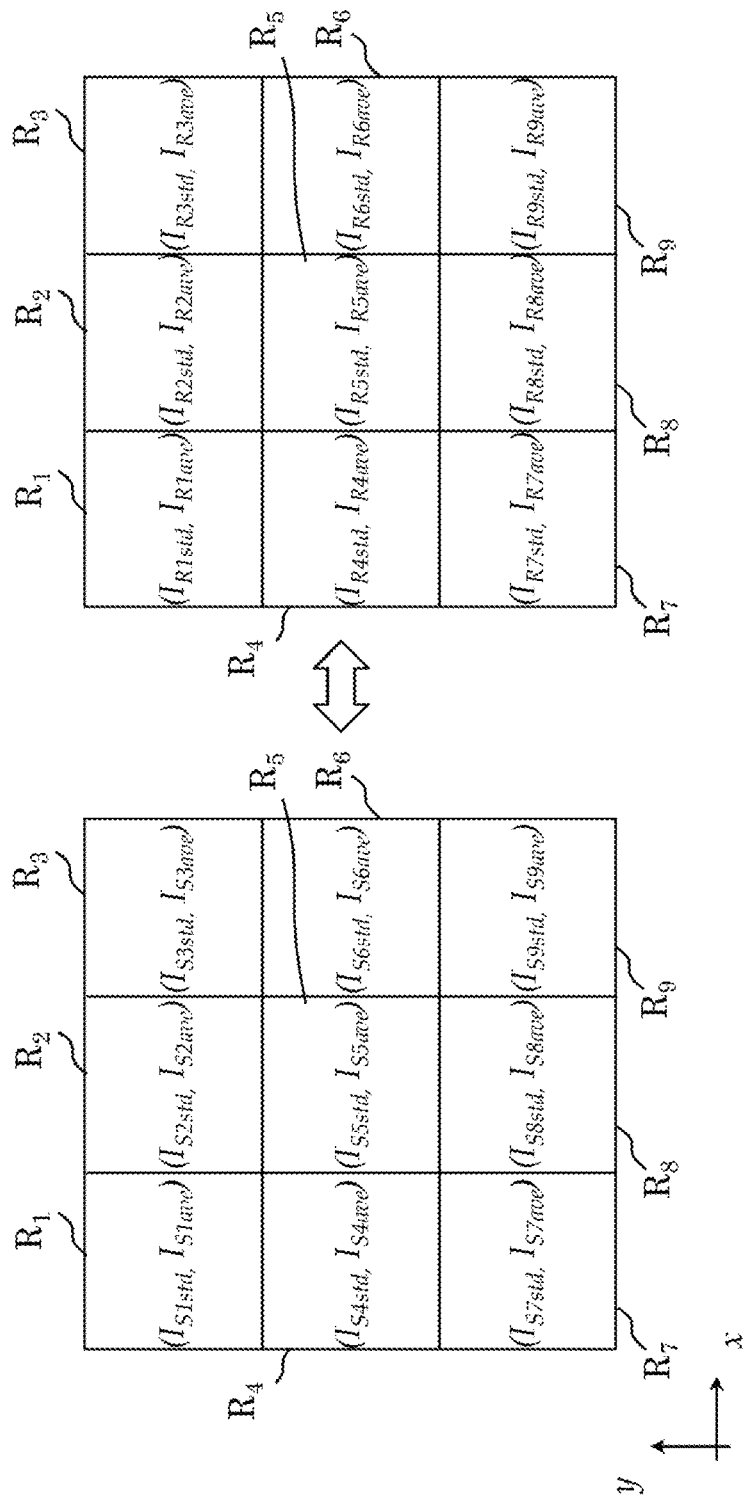
FIG. 24 is a schematic view for explaining an example of a luminance unevenness estimation operation of the defect detection device in the inspection device according to the second embodiment.

FIG. 24 is a schematic view for explaining an example of the luminance unevenness estimation operation of the defect detection device according to the second embodiment. FIG. 24 schematically shows a standard deviation $I_{Rstd}$ and an average value $I_{Rave}$ of luminance values calculated on a partial region basis for the second corrected reference image data, and a standard deviation $I_{Sstd}$ and an average value $I_{Save}$ calculated on a partial region basis for the inspection target image data 523. The example of FIG. 24 shows a case in which each of the second corrected reference image data and the inspection target image data 523 is divided into M=9 partial regions $R_1, R_2, \ldots, R_9$.

As shown in FIG. 24, the luminance unevenness estimation unit 508 calculates sets $(I_{R1std}, I_{R1ave})$ $(I_{R2std}, I_{R2ave}), \ldots, (I_{R9std}, I_{R9ave}))$ of the standard deviation $I_{Rstd}$ and the average value $I_{Rave}$, and sets $((I_{S1std}, I_{S1ave})$, $(I_{S2std}, I_{S2ave}), \ldots, (I_{S9std}, I_{S9ave}))$ of the standard deviation $I_{Sstd}$ and the average value $I_{Save}$ for the partial regions $R_1$ to $R_9$. The luminance unevenness estimation unit 508 calculates local gains $b_{g1}$ to $b_{g9}$ and local offsets $b_{o1}$ to $b_{o9}$ uniquely determined for the partial regions, based on the sets of the standard deviation $I_{Rstd}$ and the average value $I_{Rave}$ and the sets of the standard deviation $I_{Sstd}$ and the average value $I_{Save}$ corresponding to the partial regions, in accordance with equations (10) as shown below.

$$I_{Sk}(x,y) \approx I'_{Rk}(x,y) = b_{gk} I_R(x,y) + b_{ok} \quad (10)$$
$$\left. \begin{array}{l} b_{gk} = (I_{Sk})_{std}/(I_{Rk})_{std} \\ b_{ok} = (I_{Sk})_{ave} - b_{gk} \cdot (I_{Rk})_{ave} \end{array} \right\} (1 \leq k \leq M)$$

In addition, the luminance unevenness estimation unit 508 regards the calculated local gains $b_{g1}$ to $b_{g9}$ and local offsets $b_{o1}$ to $b_{o9}$ as global gains $b_g(x_1, y_1)$ to $b_g(x_9, y_9)$ and global offsets $b_o(x_1, y_1)$ to $b_o(x_9, y_9)$ at representative positions $(x_1, y_1)$ to $(x_9, y_9)$ of the corresponding partial regions $R_1$ to $R_9$, as represented by equations (11) as shown below.

$$\left. \begin{array}{l} b_{gk} \approx b_g(x_k, y_k) \\ b_{ok} \approx b_o(x_k, y_k) \end{array} \right\} (1 \leq k \leq M) \quad (11)$$

As described above, in the second embodiment, at the arbitrary position (x, y), the luminance unevenness is assumed to satisfy equation (8) described above. For this reason, the second corrected reference image data satisfies equation (8) described above at least at the nine representative positions $(x_1, y_1)$ to $(x_9, y_9)$. Hence, when equation (8) is set as simultaneous equations for the nine representative positions $(x_1, y_1)$ to $(x_9, y_9)$, we obtain linear equations given by equations (12) and (13) as shown below.

$$B_g = ZC_g \Leftrightarrow \begin{pmatrix} b_{g1} \\ b_{g2} \\ \vdots \\ b_{g9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \ldots & \ldots & \ldots & \ldots & \ldots & \ldots \\ x_9^2 & x_9 y_9 & y_9^2 & x_9 & y_9 & 1 \end{pmatrix} \begin{pmatrix} c_{g1} \\ c_{g2} \\ \vdots \\ c_{g6} \end{pmatrix} \quad (12)$$

$$B_o = ZC_o \Leftrightarrow \begin{pmatrix} b_{o1} \\ b_{o2} \\ \vdots \\ b_{o9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \ldots & \ldots & \ldots & \ldots & \ldots & \ldots \\ x_9^2 & x_9 y_9 & y_9^2 & x_9 & y_9 & 1 \end{pmatrix} \begin{pmatrix} c_{o1} \\ c_{o2} \\ \vdots \\ c_{o6} \end{pmatrix} \quad (13)$$

Here, a matrix Z based on the coordinates $(x_1, y_1)$ to $(x_9, y_9)$ of the representative positions and a vector $B_g$ including the local gains $b_{g1}$ to $b_{g9}$ and a vector $B_o$ including the local offsets $b_{o1}$ to $b_{o9}$ are determined as specific numerical values. For this reason, the luminance unevenness estimation unit 508 executes calculation represented by equations (14) based on the least square method for equations (12) and (13) described above, thereby estimating the gain vector $C_g$ and the offset vector $C_o$.

$$\left. \begin{array}{l} C_g = (Z^T Z)^{-1} Z^T B_g \\ C_o = (Z^T Z)^{-1} Z^T B_o \end{array} \right\} \quad (14)$$

2.3 Advantageous Effects According to Embodiment

According to the second embodiment, the luminance unevenness estimation unit 508 calculates the local gains $b_{g1}$ to $b_{g9}$ and the local offsets $b_{o1}$ to $b_{o9}$ applicable to the partial regions using the standard deviations and the average values $(I_{Rstd}, I_{Rave})$ and $(I_{Sstd}, I_{Save})$ for the partial regions based on equations (10). The luminance unevenness estimation unit 508 regards the local gains $b_{g1}$ to $b_{g9}$ and the local offsets $b_{o1}$ to $b_{o9}$ as the global gains $b_g(x_1, y_1)$ to $b_g(x_9, y_9)$ and the global offsets $b_o(x_1, y_1)$ to $b_o(x_9, y_9)$ at the representative positions $(x_1, y_1)$ to $(x_9, y_9)$ based on equations (11).

Accordingly, the luminance unevenness estimation unit 508 can obtain the specific values of the vectors $B_g$ and $B_o$ and the matrix Z in equations (12) and (13) as many as the number M of partial regions. For this reason, the luminance unevenness estimation unit 508 can estimate the gain vector $C_g$ and the offset vector $C_o$ in accordance with equations (14), and the correction unit 504 can generate third corrected reference image data in which the unevenness of luminance values between the two image data is corrected at an arbitrary position in accordance with equations (8) and (9).

Additionally, the luminance unevenness estimation unit 508 can estimate the gain vector $C_g$ and the offset vector $C_o$ by executing a simple matrix operation represented by equations (14) described above. Here, the size of the matrix Z is (number of partial regions)×(number of elements of distortion amount vector to be estimated) at most. The correction unit 504 can generate the third corrected reference image data by performing simple arithmetic operations of a luminance value $I_R(x, y)$ for the global gain $b_g(x, y)$ and the global offset $b_o(x, y)$. Hence, according to the second embodiment, the defect detection device 50 can generate reference image data in which the luminance unevenness is corrected by a small amount of operation.

In addition, the luminance unevenness estimation processing by the luminance unevenness estimation unit 508 can be executed together with the shift amount estimation processing and distortion amount estimation processing described in the first embodiment. For this reason, the above-described effects can further be obtained in addition to the effects according to the first embodiment.

3. Others

Note that in the above-described first and second embodiments, a case in which the correction is performed for the reference image data 522 has been described. However, the embodiments are not limited to this, and the correction may be performed for the inspection target image data 523.

Additionally, in the above-described first and second embodiments, a case in which the estimation of the global shift amount S1 by the global shift amount estimation unit 501 is performed has been described. However, this operation may be omitted. In this case, the global shift amount S1 can substantially be replaced with dimensionless coefficients ($C_{dx6}$, $C_{dy6}$) of the distortion amount vector $C_d$.

In the above-described second embodiment, a case in which the luminance unevenness correction is further applied to the configuration described in the first embodiment has been described. However, the second embodiment is not limited to this, and the luminance unevenness correction can also be applied to the configuration described in the modification of the first embodiment.

In the above-described first and second embodiments, a case in which the control unit 51 of the defect detection device 50 is operated by the CPU has been described. However, the embodiments are not limited to this. For example, the control unit 51 may include a dedicated circuit (dedicated processor) formed by one or a plurality of GPUs, ASICs, FPGAs, or the like. The control unit 51 can implement, by the dedicated processor, the functions of the global shift amount estimation unit 501, the local shift amount estimation unit 502, the distortion amount estimation unit 503, the correction unit 504, the comparison unit 505, the estimation preprocessing unit 506, the comparison preprocessing unit 507, and the luminance unevenness estimation unit 508.

Some embodiments of the present invention have been described above, but these embodiments are presented as examples, and are not aimed at limiting the scope of the invention. These embodiments may be carried out in other various forms, and various omissions, replacement, and changes may be performed within a range not departing from the gist of the invention. These embodiments and modifications thereof are included in the scope and the gist of the invention, and also included in the inventions recited in the claims and a range equivalent to them.

What is claimed is:

1. An inspection device comprising:
   an image generation device including one of an optical scanner and a scanning electron microscope and configured to generate a second image corresponding to a first image; and
   a defect detection device including a shift amount estimation circuit and configured to:
   estimate a nonlinear shift based on a plurality of partial region sets, each of the partial region sets including a first partial region in the first image and a second partial region in the second image corresponding to the first partial region; and
   detect a defect in the second image from the first image, wherein the shift amount estimation circuit is configured to:
   estimate, for each of the plurality of partial region sets, a first shift amount that minimizes an error of luminance, based on a first linear matching;
   perform a second linear matching for an entire region set of the first image and the second image, and estimate a second shift amount that minimizes an error of luminance in the entire region set; and
   perform the first linear matching for each of the plurality of partial region sets in the first image and the second image in which the second shift amount is corrected, and estimate the first shift amount for each of the plurality of partial region sets.

2. The device of claim 1, wherein the nonlinear shift includes a distortion between the first image and the second image, and
   the defect detection device estimates the distortion by applying coordinate transformation in which a position of a pixel is used as a variable.

3. The device of claim 2, wherein the defect detection device includes:
   a distortion amount estimation circuit configured to estimate a coefficient of the coordinate transformation by regarding the first shift amount as the distortion at a representative position of a corresponding partial region set.

4. The device of claim 2, wherein the coordinate transformation includes a polynomial in which position coordinates of one of the first image and the second image are used as variables.

5. The device of claim 4, wherein a square root of the number of divided regions in each of the first image and the second image is larger than a degree of the polynomial.

6. The device of claim 3, wherein the defect detection device further includes:
   a first noise filter configured to remove noise in the first image and the second image before estimation of the first shift amount and the coefficient of the coordinate transformation; and
   a second noise filter configured to remove noise in the first image and the second image at the time of detection of the defect.

7. The device of claim 1, wherein the defect detection device further includes a luminance unevenness estimation circuit configured to remove unevenness of luminance values between the first image and the second image by applying luminance value conversion in which a position of a pixel is used as a variable, and
   the luminance unevenness estimation circuit is configured to:
   calculate, for each of the plurality of partial region sets, a local gain and a local offset of the luminance value based on a standard deviation and an average value of the luminance values, and
   estimate a coefficient of the luminance conversion by regarding the local gain and the local offset as a global gain and a global offset of the luminance value of the second image from the first image at a representative position of a corresponding partial region set.

8. The device of claim 7, wherein the luminance conversion includes a polynomial for the global gain and a polynomial for the global offset, in which position coordinates of one of the first image and the second image are used as variables.

9. An inspection method executed by an inspection device comprising:
generating a second image corresponding to a first image;
estimating, for each of the plurality of partial region sets, a first shift amount that minimizes an error of luminance, based on a first linear matching;
estimating, by the defect detection device, a nonlinear shift based on a plurality of partial region sets, each of the partial region sets including a first partial region in the first image and a second partial region in the second image corresponding to the first partial region; and
detecting a defect in the second image from the first image,
wherein estimating the first shift amount includes:
performing a second linear matching for an entire region set of the first image and the second image and estimating a second shift amount that minimizes the error of luminance in the entire region set, and
performing the first linear matching for each of the plurality of partial region sets in the first image and the second image in which the second shift amount is corrected and estimating the first shift amount for each of the plurality of partial region sets.

10. The method of claim 9, wherein the nonlinear shift includes a distortion between the first image and the second image, and
the estimating the nonlinear shift includes estimating the distortion by applying coordinate transformation in which a position of a pixel is used as a variable.

11. The method of claim 10, wherein estimating the distortion includes:
estimating a coefficient of the coordinate transformation by regarding the first shift amount as the distortion at a representative position of a corresponding partial region.

12. The method of claim 10, wherein the coordinate transformation includes a polynomial in which position coordinates of one of the first image and the second image are used as variables.

13. The method of claim 12, wherein a square root of the number of divided regions in each of the first image and the second image is larger than a degree of the polynomial.

14. The method of to claim 11, further comprising:
removing noise in the first image and the second image before estimation of the first shift amount and the coefficient of the coordinate transformation; and
removing noise in the first image and the second image at a time of detection of the defect.

15. The method of claim 9, further comprising removing unevenness of luminance values between the first image and the second image by applying luminance value conversion in which a position of a pixel is used as a variable,
wherein removing includes:
calculating, for each of the plurality of partial region sets, a local gain and a local offset of the luminance value based on a standard deviation and an average value of the luminance values, and
estimating a coefficient of the luminance conversion by regarding the local gain and the local offset as a global gain and a global offset of the luminance value of the second image from the first image at a representative position of a corresponding partial region set.

16. The method of claim 15, wherein the luminance conversion includes a polynomial for the global gain and a polynomial for the global offset, in which position coordinates of one of the first image and the second image are used as variables.

17. A non-transitory computer-readable storage medium storing a program used by an inspection device configured to generate a second image corresponding to a first image, and a configured to detect a defect in the second image from the first image, wherein the program causes a processor of the inspection device to:
estimate, for each of the plurality of partial region sets, a first shift amount that minimizes an error of luminance, based on a first linear matching; and
estimate a nonlinear shift based on a plurality of partial region sets, each of the partial region sets including a first partial region in the first image and a second partial region in the second image corresponding to the first partial region, and
wherein, when estimating the first shift amount, the program further causes the processor to:
perform a second linear matching for an entire region set of the first image and the second image and estimating a second shift amount that minimizes the error of luminance in the entire region set, and
perform the first linear matching for each of the plurality of partial region sets in the first image and the second image in which the second shift amount is corrected and estimating the first shift amount for each of the plurality of partial region sets.

* * * * *